US007273181B2

(12) United States Patent
White

(10) Patent No.: US 7,273,181 B2
(45) Date of Patent: Sep. 25, 2007

(54) DEVICE AND METHOD FOR AUTHENTICATING AND SECURING TRANSACTIONS USING RF COMMUNICATION

(75) Inventor: Charles A. White, Oakland, CA (US)

(73) Assignee: Kestrel Wireless, Inc., Emeryville, CA (US)

(*) Notice: Subject to any disclaimer, the term of this patent is extended or adjusted under 35 U.S.C. 154(b) by 0 days.

(21) Appl. No.: 11/456,043

(22) Filed: Jul. 6, 2006

(65) Prior Publication Data

US 2007/0011729 A1    Jan. 11, 2007

Related U.S. Application Data

(60) Provisional application No. 60/697,108, filed on Jul. 6, 2005.

(51) Int. Cl.
*G06K 19/06* (2006.01)
(52) U.S. Cl. ........................ 235/486; 235/492
(58) Field of Classification Search ................ 235/492, 235/375, 486, 487, 493, 382, 382.5, 380; 705/50, 14, 76; 709/206, 229
See application file for complete search history.

(56) References Cited

U.S. PATENT DOCUMENTS

| | | | |
|---|---|---|---|
| 3,893,074 A | 7/1975 | Mogi et al. | |
| 5,485,520 A | 1/1996 | Chaum et al. | |
| 5,608,778 A | 3/1997 | Partridge | |
| 5,644,444 A | 7/1997 | Braithwaite et al. | |
| 5,712,638 A | 1/1998 | Issa | |
| 5,739,754 A | 4/1998 | Schrott et al. | |

(Continued)

FOREIGN PATENT DOCUMENTS

WO    WO-2004/097731 A2    11/2004

OTHER PUBLICATIONS

Anon., A Shovel Maker Searching Out Gold Diggers in the US: Brokat Aims to Raise its Profile-Following Interest in Germany over its Electronic Signature Technology. say Bertrand Benoit, Financial Times London Edition (Abstract Only). Mar. 23, 2000, p. 3.

(Continued)

*Primary Examiner*—Thien Minh Le

(57) ABSTRACT

A system is provided for authenticating and securing product transactions. An integrated circuit is attached to a target, such as an optical disc or electronic device. The integrated circuit has an RF transceiver that is capable of establishing communication with an associated reading device. The integrated circuit also has a hidden memory, which can not be read externally, and a user memory. The hidden memory stores an authentication message, while the user memory stores readable authentication information. The hidden authentication message and the authentication information are related through a cryptographic process. However, even though the integrated circuit benefits from the cryptographic security, the integrated circuit only operates relatively simple logic operations. In this way, a highly secure transaction is enabled without requiring significant processing power or time at the integrated circuit. When the integrated circuit is placed near the reader, the reader reads the authentication information, and with the cooperation of a network operation center, uses the authentication information to derive an activation code. The reader passes the activation code to the integrated circuit, which compares the activation code to its hidden activation message. If they have a proper relationship, the communication has been authenticated, and the integrated circuit proceeds to perform an action.

14 Claims, 28 Drawing Sheets

U.S. PATENT DOCUMENTS

| | | | |
|---|---|---|---|
| 5,839,050 A | 11/1998 | Baehr et al. | |
| 5,859,879 A | 1/1999 | Bolgiano et al. | |
| 5,862,117 A | 1/1999 | Fuentes et al. | |
| 5,874,902 A | 2/1999 | Heinrich | |
| 5,905,798 A | 5/1999 | Nerlikar et al. | |
| 5,909,492 A | 6/1999 | Payne et al. | |
| 6,005,476 A | 12/1999 | Valiulis | |
| 6,046,676 A | 4/2000 | Ward et al. | |
| 6,067,028 A | 5/2000 | Takamatsu | |
| 6,104,281 A | 8/2000 | Heinrich et al. | |
| 6,141,531 A | 10/2000 | Williams et al. | |
| 6,198,875 B1 | 3/2001 | Edenson et al. | |
| 6,223,160 B1 | 4/2001 | Kostka et al. | |
| 6,226,619 B1* | 5/2001 | Halperin et al. | 705/1 |
| 6,249,227 B1 | 6/2001 | Brady et al. | |
| 6,298,336 B1 | 10/2001 | Davis et al. | |
| 6,300,873 B1 | 10/2001 | Kucharczyk et al. | |
| 6,317,028 B1 | 11/2001 | Valiulis | |
| 6,351,652 B1 | 2/2002 | Finn et al. | |
| 6,381,584 B1 | 4/2002 | Ogram | |
| 6,384,710 B1 | 5/2002 | LeMense et al. | |
| 6,389,055 B1 | 5/2002 | August et al. | |
| 6,441,380 B1 | 8/2002 | Lawandy | |
| 6,483,473 B1 | 11/2002 | King et al. | |
| 6,501,435 B1 | 12/2002 | King et al. | |
| 6,542,735 B1 | 4/2003 | Carley | |
| 6,806,842 B2 | 10/2004 | King et al. | |
| 6,902,111 B2 | 6/2005 | Han et al. | |
| 6,986,151 B2 | 1/2006 | Lenssen et al. | |
| 7,065,645 B2* | 6/2006 | Teicher | 713/167 |
| 7,183,924 B1* | 2/2007 | Ku | 340/572.1 |
| 2001/0020254 A1 | 9/2001 | Blumenau et al. | |
| 2001/0037254 A1 | 11/2001 | Glikman | |
| 2002/0009296 A1 | 1/2002 | Sharper et al. | |
| 2002/0010864 A1 | 1/2002 | Safa | |
| 2002/0051536 A1* | 5/2002 | Shirakawa et al. | 380/45 |
| 2002/0072325 A1 | 6/2002 | Hayter et al. | |
| 2002/0101995 A1* | 8/2002 | Hashimoto et al. | 380/277 |
| 2002/0143634 A1 | 10/2002 | Kumar et al. | |
| 2002/0147913 A1 | 10/2002 | Lun Yip | |
| 2002/0152123 A1 | 10/2002 | Giordano et al. | |
| 2002/0165789 A1 | 11/2002 | Dudek et al. | |
| 2002/0175818 A1 | 11/2002 | King et al. | |
| 2002/0184112 A1 | 12/2002 | Nagaoka et al. | |
| 2003/0005136 A1 | 1/2003 | Eun | |
| 2003/0028787 A1 | 2/2003 | Fayad et al. | |
| 2003/0050856 A1 | 3/2003 | Rijllo et al. | |
| 2003/0078895 A1 | 4/2003 | Mackay | |
| 2003/0108007 A1 | 6/2003 | Holcman et al. | |
| 2004/0052202 A1 | 3/2004 | Brollier | |
| 2004/0054594 A1 | 3/2004 | Forster et al. | |
| 2004/0107246 A1 | 6/2004 | Akashika et al. | |
| 2004/0200061 A1 | 10/2004 | Coleman et al. | |
| 2004/0228262 A1 | 11/2004 | Bigly | |
| 2004/0260778 A1* | 12/2004 | Banister et al. | 709/206 |
| 2005/0083829 A1 | 4/2005 | Selinfreund et al. | |
| 2005/0114326 A1 | 5/2005 | Smith et al. | |
| 2005/0240498 A1 | 10/2005 | Thaler | |
| 2006/0200412 A1* | 9/2006 | Fahrny et al. | 705/50 |
| 2007/0114365 A1 | 5/2007 | Potyrailo et al. | |
| 2007/0114366 A1 | 5/2007 | Wisnudel et al. | |
| 2007/0114621 A1 | 5/2007 | Wisnudel et al. | |
| 2007/0115762 A1 | 5/2007 | Wisnudel et al. | |
| 2007/0116920 A1 | 5/2007 | Krishnan et al. | |
| 2007/0116988 A1 | 5/2007 | Wisnudel et al. | |

OTHER PUBLICATIONS

Anon., Nokia Trials Cashless Payment Technology for Mobile Phones, *Precision Marketing*. Jan. 29, 2001, vol. 13, No. 18, p. 8.

Harris, R., Security Measures Turn off Audliophiles from New Gadgets to Thwart Digital Piracy. Companies Have Created CD Players and Discs That Block Copying. *Philldelphia Inquirer*, Nov. 7, 2002, City-D-East Edition, business Secilon, p. C11, see paragraph beginning "DVD-Audio discs use."

Hoffman, K.E., New Options in Wireless Payments, Internet World, Apr. 1, 2001, vol. 7, No. 7, p. 37.

Schoolcraft, L.R., Powertel Tests Smart Cards at FSU, Business Journal—Jacksonville, Jan. 30, 1998, vol. 13, No. 17, p. 3.

Dezoysa, S., The Cost of M-Commerce, Telecommunications, Jul. 2001, vol. 35, No. 7, p. 10.

\* cited by examiner

DEVICE AND METHOD FOR AUTHENTICATING AND SECURING TRANSACTIONS USING RF COMMUNICATION

RELATED APPLICATIONS

This application claims priority to U.S. patent application No. 60/697,108, filed Jul. 6, 2005, and entitled "Method for Securing Actions at a Target", which is incorporated herein in its entirety.

BACKGROUND

1. Field

The present invention relates to circuits and processes for authenticating and securing a transaction. More particularly, the invention relates to circuits and processes that enable a secure transaction responsive to interrogating an integrated circuit using an RF communication path.

2. Description of Related Art

The manufacturer or distributor of physical goods faces difficult problems in efficiently managing the distribution chain. The distribution chain, which may include distributors, shippers, warehousers, and retailers, each form an important link in bringing products to consumers. The manufacturer relies on the integrity of its distributors and retailers to assure that products are properly sold or otherwise delivered. Unfortunately, the distribution chain is often improperly managed, resulting in an ineffective path to market for the manufacturer's products. For example, products may be misappropriated by a corrupt distributor, by employees of the retailer, or by consumers. Manufacturers may also define distribution agreements with its distributors, where the manufacturer sets rules and restrictions on its distributors. These rules are typically used to assure that a fair distribution model is used, so that each distributor is able to maintain its profit margin, and to assure that consumers are satisfied with customer support. However, some retailers may try to avoid a manufacturer's distribution rules, and sell outside their designated market, or purchase products from an unauthorized source.

To better manage the distribution of products, manufacturers, distributors, and retailers have cooperated to implement a standard bar-coding process, UPC, to allow more automated tracking of inventory and products. However, the bar code label is used only to identify a class of product, so every item in that class has the same bar code indicator. While the UPC system has improved management of the distribution channel, additional information is needed. To fill some of the gaps in the UPC model, an RFID system has been proposed, and in limited cases, is being implemented. In the RFID system, a small integrated circuit is integrated into a tag, and the tag attached to a product. The circuit has sufficient memory that each tag can have a different value, thereby allow every product to be individually identified. In use, a unique value is stored into the tag, and the tag attached to the product. In the distribution chain, the product may be scanned by an RF reader, which reads the tag identifier. In this way, the product is tracked and monitored as it moves through the distribution chain. At the retail store, a consumer takes the product to a check stand, where the product is moved past another RF reader. The RF reader reads the tag identifier, and retrieves the price for the product. The sale is completed, and the product is removed from the store's inventory system.

The RFID system holds promise for providing much more information to manufactures, which will be useful in assisting in the control and management of the distribution process. However, the information stored on the RFID tag may be easily retrieved by commercially available readers, so can not be used to convey any sensitive information. Further, the tag and its circuit operate on the very limited power the circuit is able to derive from the RF signal, and must complete its operation as its being moved across a reader's RF field. This means that only limited computation can be performed due to power and time limitations, and that only a limited number of values can be communicated during the brief time the tag is energized. Accordingly, the tag's circuit is incapable of performing any meaningful encryption or decryption processes. In this way, the advances made in cryptography are not available to assist in securing tag-reader transactions.

Since the tag's information is subject to unauthorized access, no critical or vital information may be stored, thereby limiting the usefulness of the RFID system. What is needed then, is a way to better authenticate and secure the information conveyed from an RF integrated circuit. Such a system would greatly improve a manufacturer's ability to manage distribution of its products.

SUMMARY

Briefly, the present invention provides a system for authenticating and securing product transactions. An integrated circuit is attached to a target, such as an optical disc or electronic device. The integrated circuit has an RF transceiver that is capable of establishing communication with an associated reading device. The integrated circuit also has a hidden memory, which can not be read externally, and a user memory. The hidden memory stores an authentication message, while the user memory stores readable authentication information. The hidden authentication message and the authentication information are related through a cryptographic process. However, even though the integrated circuit benefits from the cryptographic security, the integrated circuit only operates relatively simple logic operations. In this way, a highly secure transaction is enabled without requiring significant processing power or time at the integrated circuit. When the integrated circuit is placed near the reader, the reader reads the authentication information, and with the cooperation of a network operation center, uses the authentication information to derive an activation code. The reader passes the activation code to the integrated circuit, which compares the activation code to its hidden activation message. If they have a proper relationship, the communication has been authenticated, and the integrated circuit proceeds to perform an action.

In one example, a random plaintext number is stored as the hidden authentication message, and the user memory has authentication information that includes an identifier, as well as an encrypted version of the plaintext number. When the integrated circuit is placed near a reader, the reader reads the authentication information, which is sent to a network operation center. The network operation center uses the identification information to retrieve a decryption key, and uses the key to decrypt the encrypted message to derive the plaintext number. The plaintext number is sent to the reader, which communicates it to the integrated circuit. The integrated circuit does a simple logical compare between the received number and the hidden number, and if they match, the integrated circuit proceeds to perform an action. The action may be, for example, activating or deactivating the product the circuit is attached to. The hidden authentication message and the authentication information are related through a cryptographic process. In this example, the integrated circuit benefits from the cryptographic security, even though the integrated circuit only operates a relatively simple logic operation. In this way, a highly secure transaction is enabled without requiring significant processing power or time at the integrated circuit.

In another example, an authentication code is stored as the hidden authentication message, and the user memory has authentication information that includes identifiers, as well as a public key that can be used to recreate the authentication code. When the integrated circuit is placed near a reader, the reader reads the authentication information, which is sent to a network operation center. The network operation center uses the identification information to retrieve a private key, and uses the public key, private key and other authentication information generate the authentication code. The authentication code is sent to the reader, which communicates it to the integrated circuit. The integrated circuit does a simple logical compare between the received code and the hidden code, and if they match, the integrated circuit proceeds to perform an action. The action may be, for example, activating or deactivating the product it is attached to. The hidden authentication message and the authentication information are related through a cryptographic process. In this example, the integrated circuit benefits from the cryptographic security, even though the integrated circuit only operates a relatively simple logic operation. In this way, a highly secure transaction is enabled without requiring significant processing power or time at the integrated circuit.

In yet another example, the present invention discloses a cryptographic process. Two pairs of public/private keys are generated in such a way that a combination of the first private key and the second public key is equivalent to the combination of the first public key with the second private key. The key combinations, when combined with additional meaningful information, produce a limited set of authentication messages. The process provides a highly secure method of authentication requiring minimal computation and power at the embedded processor.

Advantageously, the present invention enables a highly secure and authenticated transaction, even when the authorizing circuit is operating in a low-power, low processing capability environment. This means that an RFID tag or other RF-enabled integrated circuit may be used to communicate sensitive information, and become an integral part of a secure transaction process. This enables an RF-enabled circuit to perform secured actions, thereby allowing manufacturers to enforce distribution and use rules

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
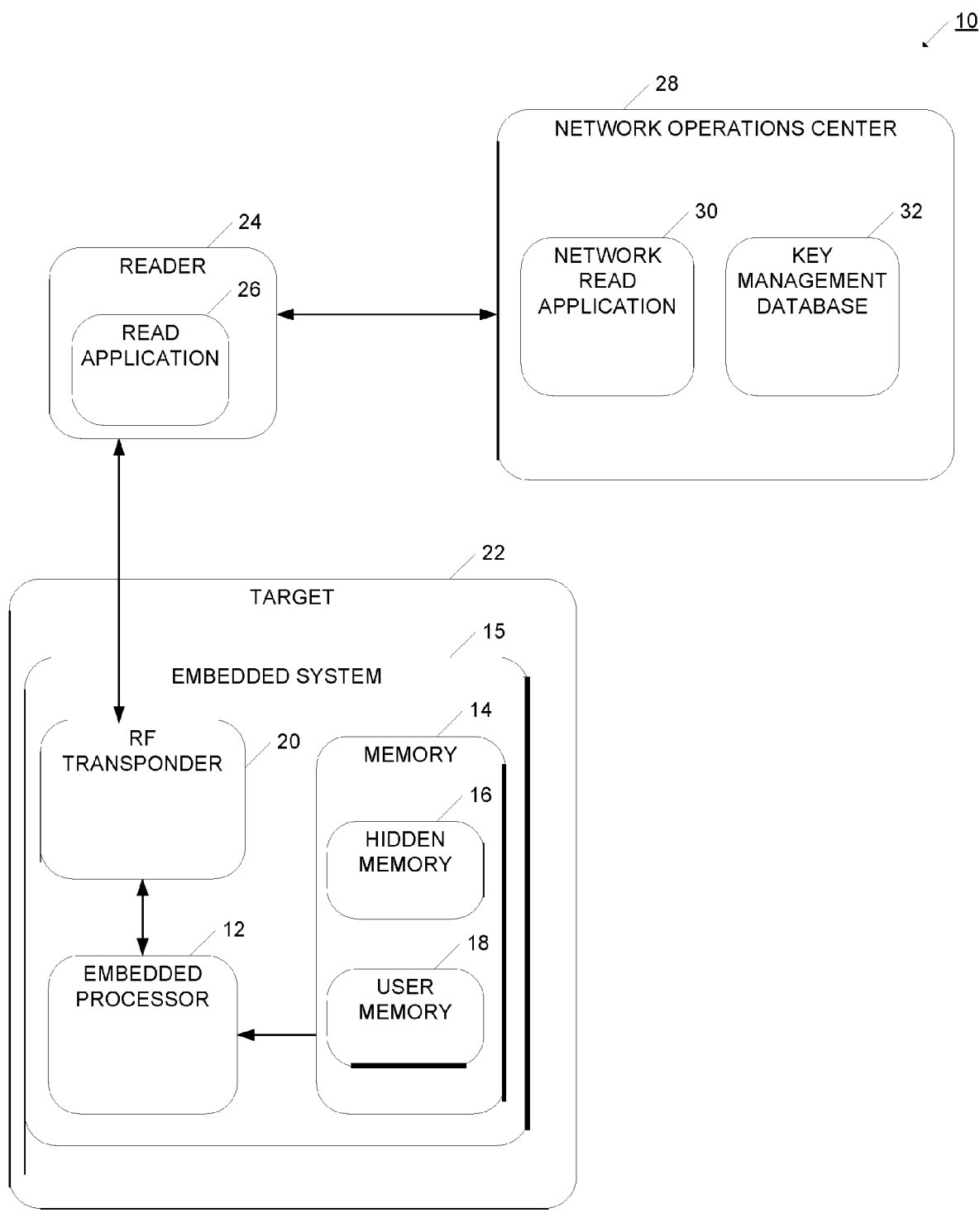
FIG. 1 is a block diagram of a system for authenticating a transaction in accordance with the present invention.

Referring now to FIG. 1, system 10 for authorizing a target is illustrated. More particularly, system 10 enables the controlled distribution of a target good, and enables conditions to be set as to when target 22 may be used or activated. In this way, a target may be disabled or deactivated at the time of manufacture, and rules or conditions defined as to when the target can be activated or used. Target 22 may be, for example, an optical disc such as a DVD, CD, gaming disc, HD DVD, or Blu-Ray DVD. Target 22 may also be an electronic device such as a portable music player, shaver, or drill, or target 22 may be a passport, driver's license, coupon, or other non-electronic good. It will be understood that target 22 may take other electronic or non-electronic forms.

Target 22 typically has a utility or primary use. For example, if target 22 is a portable music player, then its primary use is to play music files. In another example, if target 22 is a DVD, then its primary use is to be read by an associated DVD player for presenting a movie or audio file to a user. Typically, the "use" or enjoyment of the target is the reason consumers are motivated to purchase or otherwise obtain target 22. Stated differently, the distribution of a target good may be effectively controlled and monitored by controlling when the target may be activated. By securing and controlling the ability to use the product, the distribution chain and retailers have substantially less burden in securing the physical target itself. For example, if a DVD disc can not be played without an authorized activation using system 10 at the time of purchase, then the DVD disc may be more freely displayed and distributed, because the retailer is confident that the disc must be purchased before it would be useful or desirable to anyone.

Generally, system 10 is useful for enforcing use or access rules for a physical target. For example, a manufacturer of a target may desire that a consumer purchase the target from an authorized retailer prior to that consumer using the target. In another example, a movie distributor may desire that a DVD only be played after a particular release date, and only after the distributor has confirmed it has been paid. In these examples, the owner of a tangible product may define the conditions under which ownership or use-rights are passed to another. In controlling the right to use the target, system 10 typically disables target 22 during the manufacturing process. The network operation center 28 has a set of rules that define the conditions under which the target's use may be activated. At a later time, target 22 is placed near reader 24, which cooperates with the network operation center 28 to confirm that the target is in a condition for activation. If all is in order, reader 24 sends a code to target 22, and if the code is proper, then target 22 activates.

In using system 10, it is important that target 22 activate responsive only to authorized and authenticated messages. In this way, a secure and robust rights management system may be confidently used by manufacturers, distributors, retailers, and consumers. As will be fully described below, system 10 enables strongly secured activation transactions, even though there is limited processing capability and little electrical power available at the target. For example, target 22 may be activated at a point of sale register, where the only power available for target activation is derived from the RF signals emitted from an RF reader. Further, system 10 eliminates or reduces any need for encrypting or decrypting at the target, enabling the use of simpler and reduced processing capabilities on the target. Accordingly, system 10 provides secure, authenticated activation transactions, and is sufficiently efficient to enable robust and repeatable transactions, even in a real-world retail environment.

In performing the authorization process, system 10 uses an embedded processor system 15 that is attached to target 22. Embedded processor system 15 is constructed to selectively activate or deactivate the usefulness of the target. Embedded system 15 comprises embedded processor 12, memory 14, and RF transponder 20. It will be appreciated that the functionality of embedded processor 12 may be accomplished by a single processor or distributed over two or more processing devices. Embedded processor 12 is linked to memory 14. It will be appreciated that memory 14 may be implemented as flash memory, as a PROM, as another type of storage technology, or as a combination of two or more distinct storage technologies. Memory 14 has hidden memory 16 and user memory 18. In one example, the embedded processor 12 may use the contents of hidden memory 16 in making activation decision, but the contents of hidden memory 16 cannot be read externally. In one example hidden memory 16 is a write once memory, and can only be read and used by the embedded processor 12. Any other attempted read or use would destroy the hidden memory or other circuit device. In one example, user memory 18 may be written to and read from by the embedded processor, and may be used to hold application code, data values, codes, and commands.

Embedded processor 12 is also connected to RF transponder 20. In one example, RF transponder 20 is a transceiver operating at a UHF RFID frequency in the range of about 890 MHz to about 950 MHz. In another example, RF transponder 20 is a transceiver operating at an RFID frequency in the range of about 2400 MHz to about 2483 MHz. RF transponder 20 may also operate at an HF frequency in the range of about 13.56 MHz, enabling Near Field Communication (NFC) functionality. It will be understood that the RF transceiver may be selected according the current RF standards or according to application specific requirements.

System 10 has target 22. It will be understood that target 22 is an article, item, or media. In one example, target 22 is media for storing content such as audio, video, images, codes, and other types of data and information. In one example, target 22 is a compact disc (CD), video disc, digital versatile disc (DVD), laser disc, or hologram. In another example, target 22 is an electric shaver. Embedded system 15 is attached to target 22. In one example, embedded system 15 is formed as a tag and attached to target 22. It will be appreciated that the tag may be removable or that it may be permanently attached to target 22. In another example, embedded system 15 is integrated into the circuitry of target 22. Embedded system 15 is capable of performing an action on target 22. In one example embedded system 15 is capable of performing the action of deactivating target 22. Deactivation may include reducing the functionality of target 22. For example, a DVD may be deactivated by making some or all of the contents unreadable. In another example, embedded system 15 is capable of performing the action of activating target 22. Activation, may include enabling deactivated functionality of target 15.

System 10 also has reader 24. Reader 24 communicates with embedded system 15 via RF transponder 20. In one example, reader 24 is operated by a merchant at the point of sale of target 22. At the time of sale, target 22 may be brought into physical proximity of reader 24 to initiate an authentication process that will result in embedded system 15 enabling target 22. Read application 26 operates on reader 24. Read application 26 manages the communication between embedded system 15 and network operation center (NOC) 28. NOC 28 operates network read application 30. Network read application 30 handles communication to and from reader 24 and performs functions related to the authentication process. NOC also maintains key management database 32 to enable cryptographic features of the authentication process.

In use, the NOC 28 cooperates with reader 24 and embedded processor system 15 to implement a highly secure activation process, with only limited processing capability needed in the embedded processor. As will be understood, the NOC 28 is tasked with computational intensive operations, such as cryptographic processes, while the embedded processor is permitted to perform minimal algorithmic processes, such as simple matching routines or other basic logic functions. By concentrating the cryptographic intensive functions with the NOC, a highly sophisticated encryption process is enabled, even when the target to be authenticated has very limited power available. With the components of system 10 generally introduced, the process for securely activating a target will be described.

Figure 2:
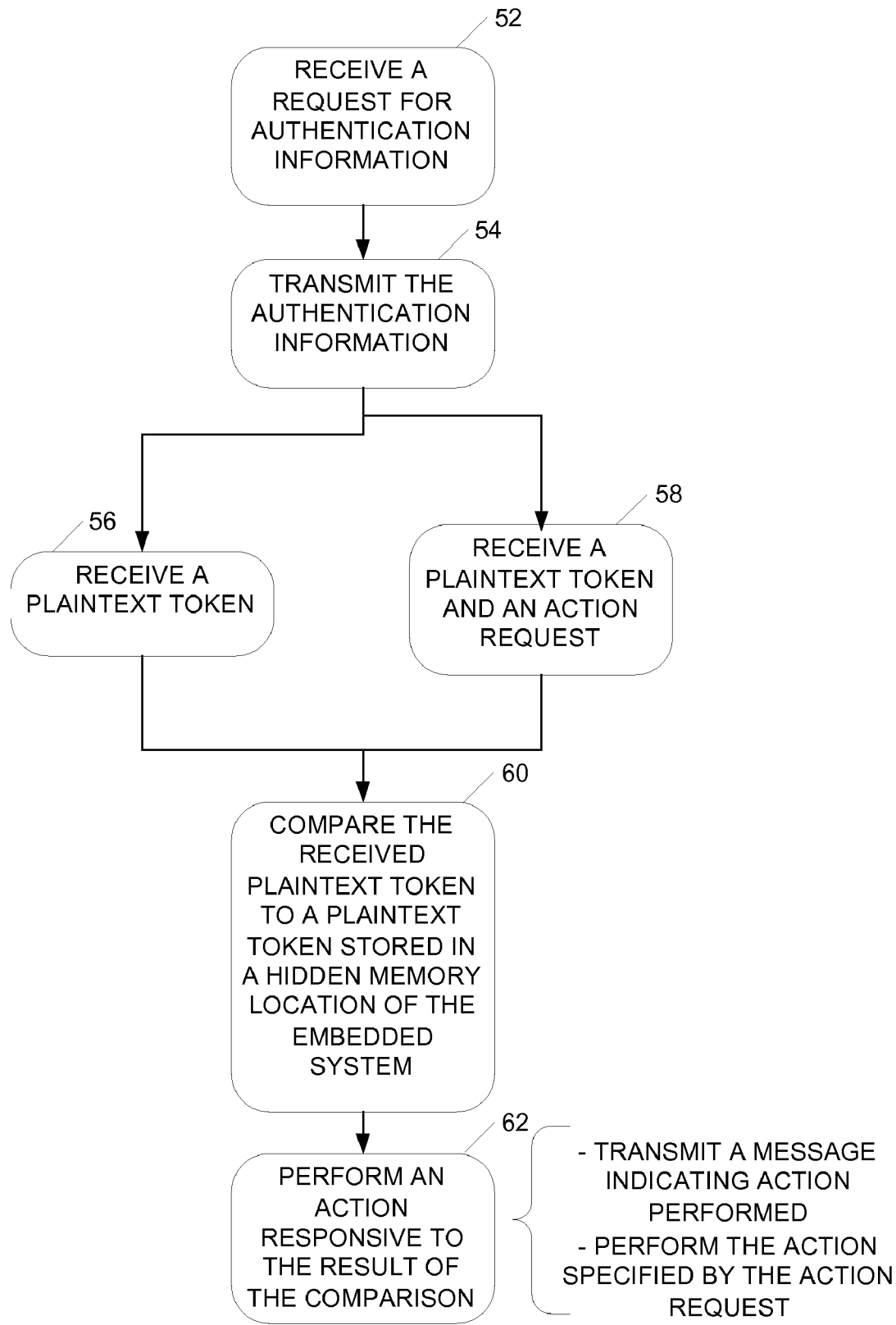
FIG. 2 is a flowchart of a method for performing an action using an embedded system in accordance with the present invention.

Referring now to FIG. 2, method 50 for enabling authentication is illustrated. Typically, this method will be used when a disabled target is presented for activation at an activation site. For example, a disabled target may be displayed at a retail store, and a consumer takes the disabled target to a check stand. A clerk passes the disabled target over an RF reader, and the activation process initiates. Method 50 operates on an embedded system, such as embedded system 15 described with reference to FIG. 1. Generally, the embedded processor is attached to the target, and is initially set to have disabled the usefulness of the target. The method begins with the embedded system receiving a request for authentication information as shown in step 52. It will be understood that authentication information may include any information useful in the authentication process. Authentication information may include an identifier for a manufacturer, an identifier for a merchant, an identifier for a public/private key pair, an identifier for an embedded system, an encrypted token, or a public key. In one example, an identifier is a series of binary bits that may be interpreted as an identifying number or ID number. In another example, an identifier may be interpreted as a word or as a combination of letters and numbers. In one example, the request for authentication information is received by the embedded system from a reader at the point of sale when a target is sold.

After receiving a request for the authentication information, the embedded system accesses the authentication information in user memory and transmits the authentication information to the reader as shown in step 54. It will be understood that the authentication information will have previously been loaded into the user memory of the embedded system. In one example, the authentication information comprises an encrypted token. The encrypted token is an encrypted representation of a plaintext token stored in the hidden memory of the embedded processor. It will be appreciated that a token, as used in the authentication process, is a series of binary bits. In one example, the bits comprising a plaintext token may have meaning when interpreted as letters or numbers. In another example, the bits of a plaintext token may have no meaning when interpreted as numbers or letter. In one example, the encrypted token is generated by encrypting the plaintext token with a public key.

After further processing is done external to the embedded system, the embedded system receives a plaintext token as shown in step 56. Alternatively, the embedded system receives a plaintext token and an action request as shown in step 58. An action request is an indication of an action to be performed if the authentication process succeeds. In one example, the action request comprises an indication that if the authentication process succeeds, the embedded system should activate the target.

After receiving a plaintext token, the embedded system compares the received plaintext token to a plaintext token stored in hidden memory as shown in step 60. It will be appreciated that the comparison may comprise matching the received plaintext token to the stored plaintext token, finding that the received plaintext token and the stored plaintext token do not match, or using logical steps in comparing the received plaintext token and the stored plaintext token. After performing the comparison, the embedded system will perform an action responsive to the comparison as shown in step 62. In one example, the action performed if the received plaintext token and the stored plaintext token match is activation of the target. In another example, no action is performed if the received plaintext token and the stored plaintext token do not match. In another example, the embedded system transmits a message indicating the action the embedded system performed or the result of the comparison. In another example, the embedded system performs the action specified in an action request reactant to the result of the comparison.

Figure 3:
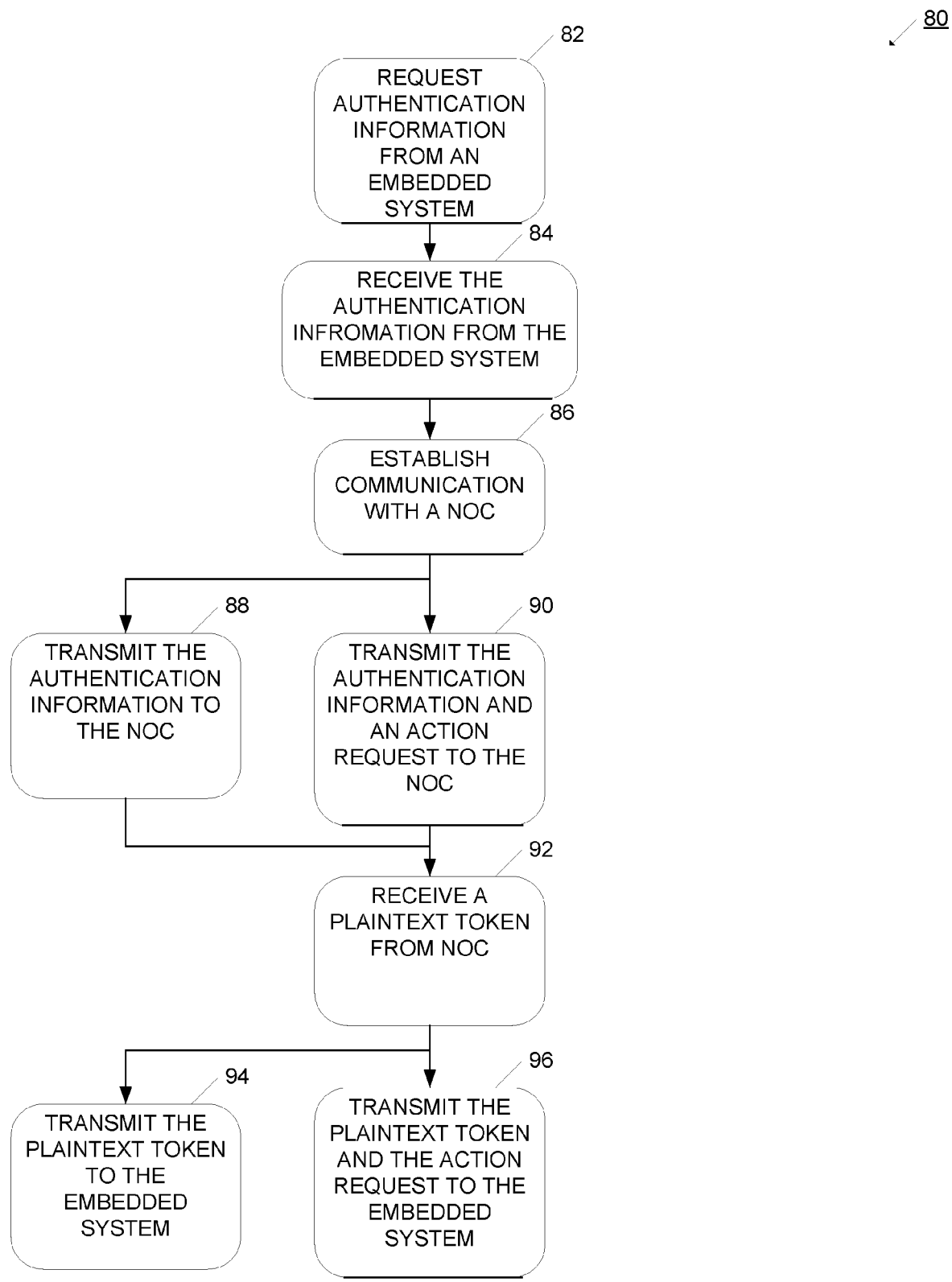
FIG. 3 is a flowchart of a method for authenticating a transaction using an RF reader in accordance with the present invention.

Referring now to FIG. 3, method 80 for enabling authentication is illustrated. Method 80 operates on a reader and begins when the reader requests authentication information from an embedded system. In one example the authentication information comprises an encrypted token. The encrypted token is an encrypted representation of a plaintext token stored on the embedded system. After the request for authentication information is made, the reader receives the authentication information from the embedded system as shown in step 84. After receiving the authentication information, the reader establishes communication with a network operation center as shown in step 86. In one example the reader establishes a secure session with the NOC. This session can be established, for example, using standard public key encryption methods. After establishing a connection with the NOC, the reader transmits the authentication information to the NOC as shown in step 88. Alternatively, the reader transmits the authentication information and an action request to the NOC as shown in step 90. After more processing done external to the reader, the reader receives a plaintext token from the NOC as shown in step 92. After receiving the plaintext token from the NOC, the reader transmits the plaintext token to the embedded system as shown in step 94. Alternatively, the reader transmits the plaintext token and the action request to the embedded system as shown in step 96.

Figure 4:
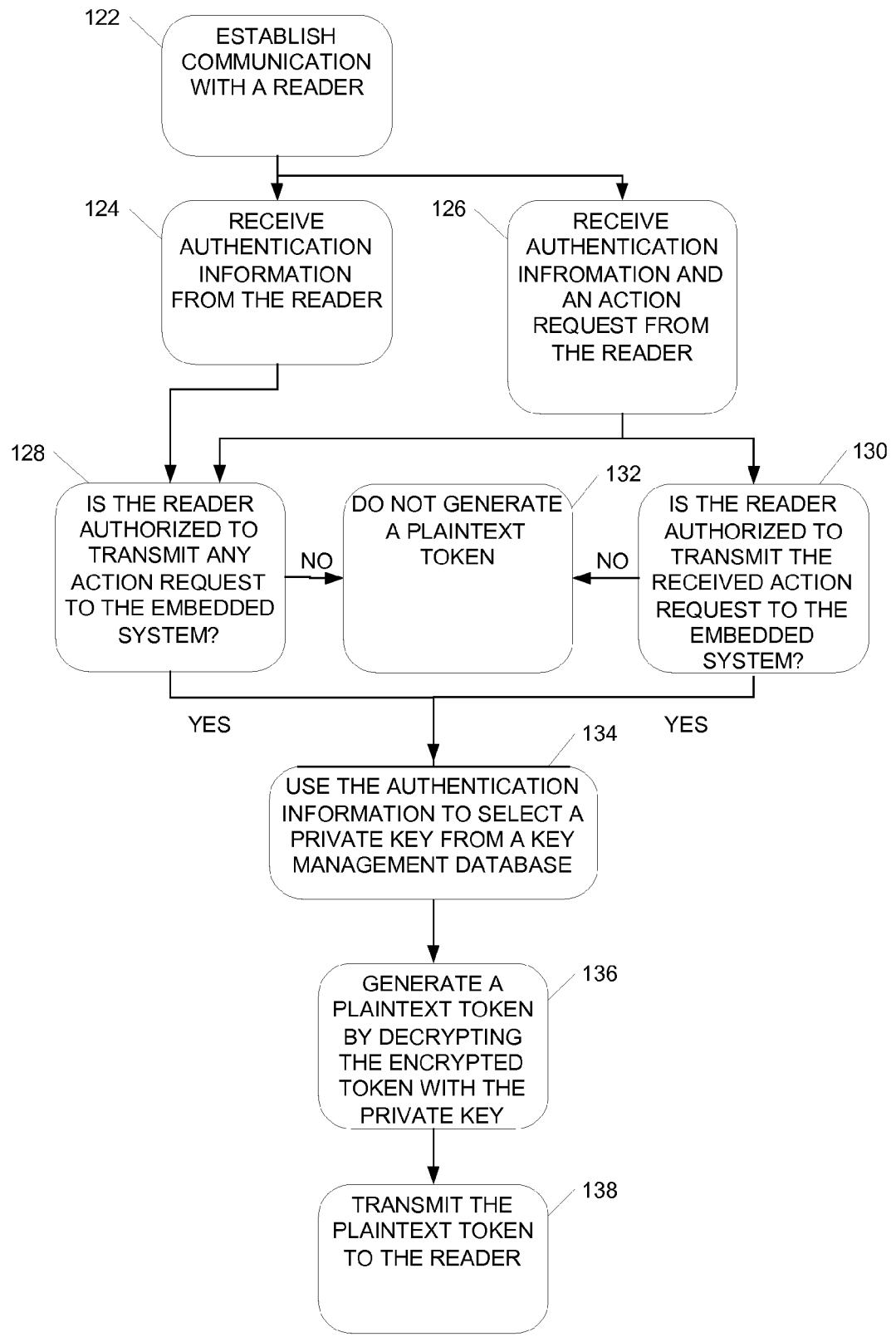
FIG. 4 is a flowchart of a method for authenticating a transaction using a network operation center in accordance with the present invention.

Referring now to FIG. 4, method 120 for enabling authentication is illustrated. Method 120 operates on a network operations center and begins when the NOC establishes communication with a reader as shown in step 122. In one example, this occurs when a target is brought to a point of sale and the reader contacts the NOC. In one example, the process of establishing communication from a reader involves receiving identifying information about the reader such as a unique identification number. After establishing communication with a reader, the NOC receives authentication information from the reader as shown in step 124. Alternatively, the NOC receives both the authentication information and an action request from the reader as shown in step 126. In one example the authentication information comprises an encrypted token and information sufficient to determine the appropriate private key to use to decrypt the encrypted token. In one example this information sufficient to determine the appropriate private key is an identification number for a public/private key pair. After receiving the authentication information, the NOC determines if the reader is authorized to transmit action requests to the embedded system as shown in step 128. For example, during the load process, a merchant ID number may be loaded into the user memory of the embedded system attached to a target indicating the merchant that the target is going to be sold by. In addition, the NOC maintains a list of the readers operated by different merchants. When the reader transmits the authentication information, including the merchant ID, to the NOC, the NOC can determine if the reader corresponds to a the merchant whose ID was stored on the embedded processor. In one example, if the reader does not correspond to the merchant indicated in the authentication information, the NOC determines that the reader is not authorized to transmit any action request to the embedded system.

In another example, in addition to maintaining a list of the readers operated by a merchant, the NOC also maintains a list of the action requests a merchant or reader may transmit to a particular embedded system. For example, if the functionality of a target comprises multiple tiers, it may be desirable for the readers of a particular merchant to only be able to activate a limited portion of the full functionality of the target. Specifically, a target may have two operational modes and it may be desirable for a particular merchant to only sell targets operating in mode one. In addition to maintaining a list of the readers corresponding to the merchant, the NOC also maintains a list of the action commands that the readers of a particular merchant are allowed to transmit to a particular type of target. When the NOC receives the authentication information and an action request from the reader, the NOC can determine if the reader is authorized to transmit that specific action request to the embedded system as shown in step 130.

If the reader is not authorized to send any action request to the embedded system or the reader is not authorized to send the received action request to the embedded system, the NOC does not generate a plaintext token as shown in step 132. This effectively ends the authentication process. However, if the NOC determines that the reader is authorized to send action requests, or the received action request, to the embedded system, the NOC proceeds to use the authentication information received from the reader to select a private key from a key management database as shown in step 134. In one example, the key management database contains public/private key pairs indexed by an identification number associated with the key pair. In one example, the identification number corresponding to a public/private key pair and an encrypted token generated using the public key from that pair are stored as authentication information in the user memory of the embedded system during the load process. When the NOC receives the authentication information from the reader, it uses the public/private key pair ID number to select the private key corresponding to the public key used to generate the encrypted token. Having selected the appropriate private key, the NOC generates a plaintext token by decrypting the encrypted token received in the authentication information with the selected private key as shown in step 136. After generating the plaintext token, the NOC transmits the plaintext token to the reader as shown in step 138.

Figure 5:
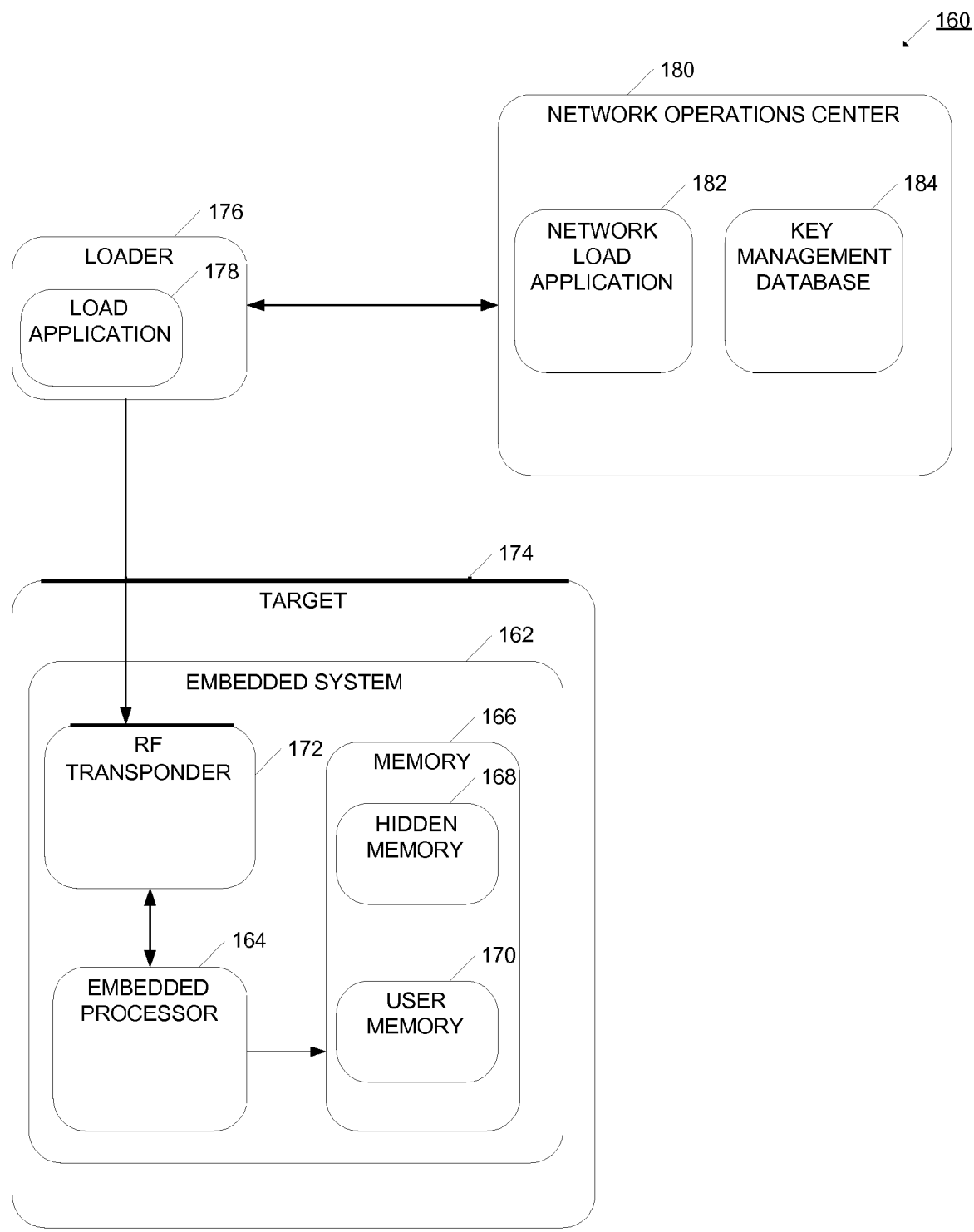
FIG. 5 is a block diagram of loading an embedded processor system in accordance with the present invention.

Referring now to FIG. 5, system 160 for loading an embedded processor is illustrated. Loading, as used here, is the process of pre-storing information into the memory of the embedded system. The loading process may be done by the manufacturer, for example, or may be done by another trusted entity. Since the loading process has access to important cryptographic keys and algorithms, it is important that the loading process be strongly secured. System 160 has embedded system 162. Embedded system 162 has embedded processor 164, memory 166 and RF transponder 172. Memory 166 is further comprises hidden memory 168 and user memory 170. It will be understood that embedded system 162 is similar to embedded system 15 described in FIG. 1. Embedded system 162 is linked to target 174. It will be understood that target 174 is similar to target 22 in FIG. 1. Target 174 may be, for example, a CD, DVD, HD DVD, Blu-Ray DVD, or gaming disc.

System 160 also has loader 176. In one example, loader 176 is a device located at the manufacturing site of target 174. In another example loader 176 is a device located at the manufacturing site of embedded system 162. In a third example, loader 176 is a device located at the site where embedded system 162 is linked to target 174. Loader 176 enables communication between embedded system 162 and NOC 180. Loader 176 operates load application 178. Load application 178 performs functions related to the load process. NOC 180 operates network load application 182. Network read application 182 handles communication to and from loader 176 and performs functions related to the load process. NOC 180 also maintains key management database 184 to enable cryptographic features of the authentication process.

Figure 6:
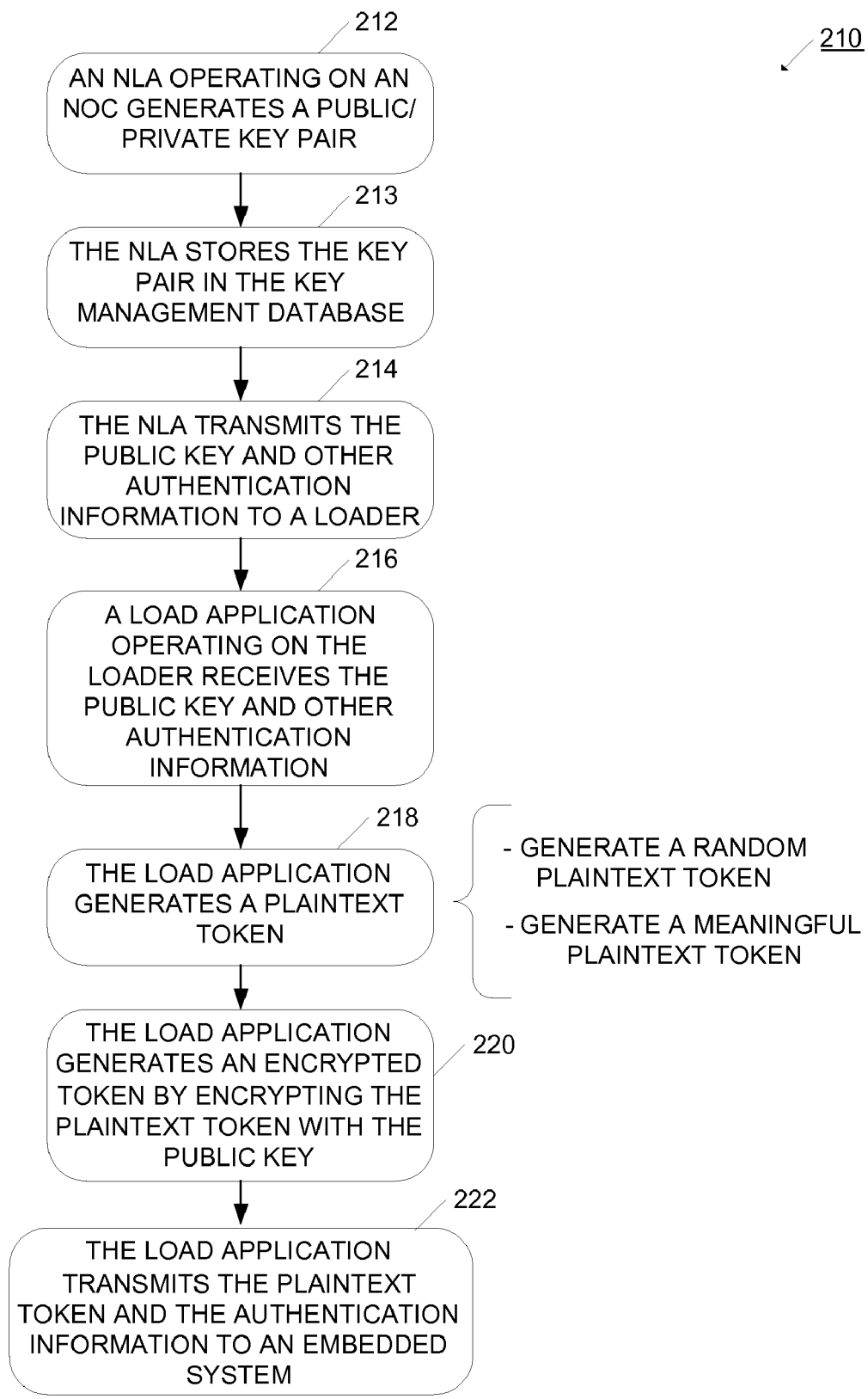
FIG. 6 is a flowchart of a process for loading an embedded processor system in accordance with the present invention.

Referring now to FIG. 6, method 210 for loading an embedded processor is illustrated. Method 212 begins when the network load application (NLA) operating on a NOC generates a public/private key pair as shown in step 212. In one example, the NLA generates a key pair responsive to a request from a loader. After generating the key pair, the NLA stores the key pair in the key management database as shown in step 213. In one example, the key pair is stored according to an ID number associated with the key pair. In another example, only the private key is stored in the key management database. After storing the key pair, the NLA transmits the public key and other authentication information to a loader as shown in step 214. In one example the authentication information includes the ID number associated with the public key.

After the NLA transmits the public key and authentication information to a loader, a load application operating on the loader receives the public key and authentication information as shown in step 216. After receiving the public key and authentication information, the load application generates a plaintext token. In one example, the plaintext token is randomly generated. In another example, the plaintext token is generated to contain meaningful information. For example, the plaintext token may be generated as a combination of identification numbers for a manufacturer, merchant, key pair, and embedded system. After generating a plaintext token, the load application generates an encrypted token by encrypting the plaintext token with the public key as shown in step 220. After generating the encrypted token, the load application transmits the plaintext token and authentication information to the embedded system as shown in step 222. In one example the authentication information comprises the encrypted token and the identification number associated with the public key used to generate the encrypted token.

Figure 7:
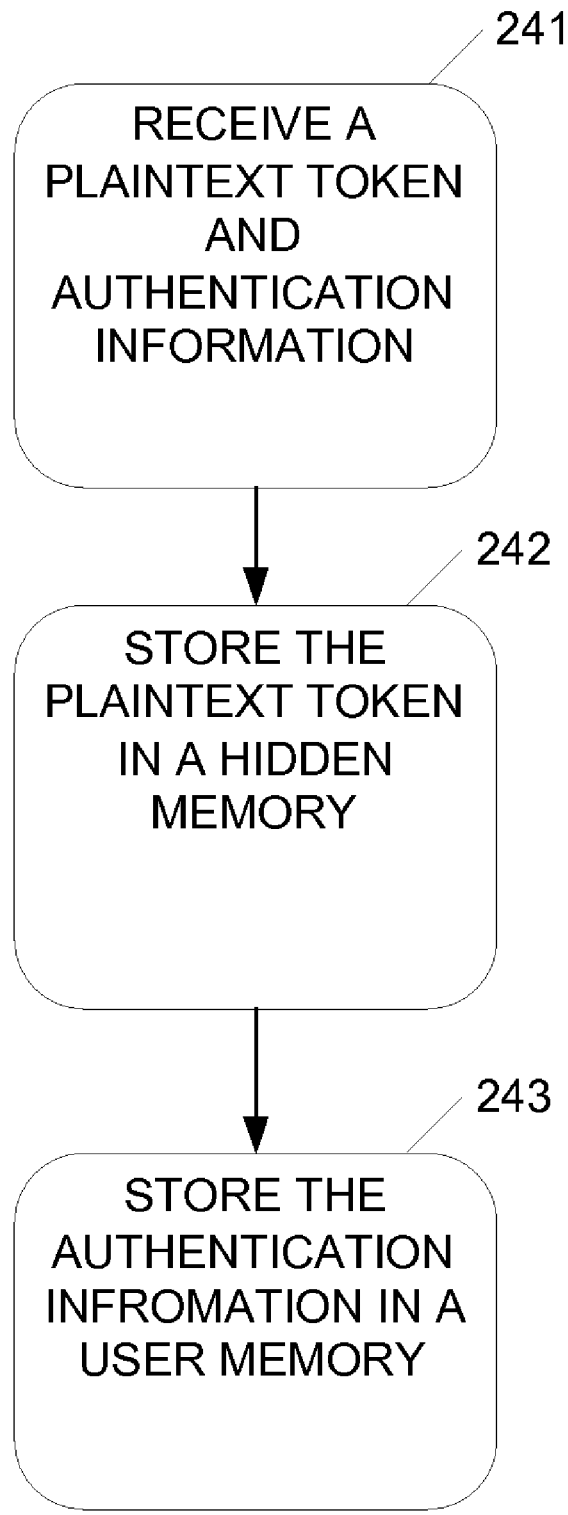
FIG. 7 is a flowchart of a process for loading an embedded processor system in accordance with the present invention.

Referring now to FIG. 7, method 240 for enabling the load process is illustrated. Method 240 operates on an embedded system and begins when the embedded system receives a plaintext token and authentication information as shown in step 241. In one example, the authentication information comprises an encrypted token and an identification number associated with the public key used to generate the encrypted token. After receiving the plaintext token and authentication information, the embedded system stores the plaintext token in a hidden memory as shown in step 242. In one example, the hidden memory is a write once memory and once the plaintext token has been written there, the contents of the hidden memory can no longer be changed. After storing the plaintext in hidden memory, the embedded system stores the authentication information in user memory as shown in step 243. At this point, the loading process is complete.

Figure 8A:
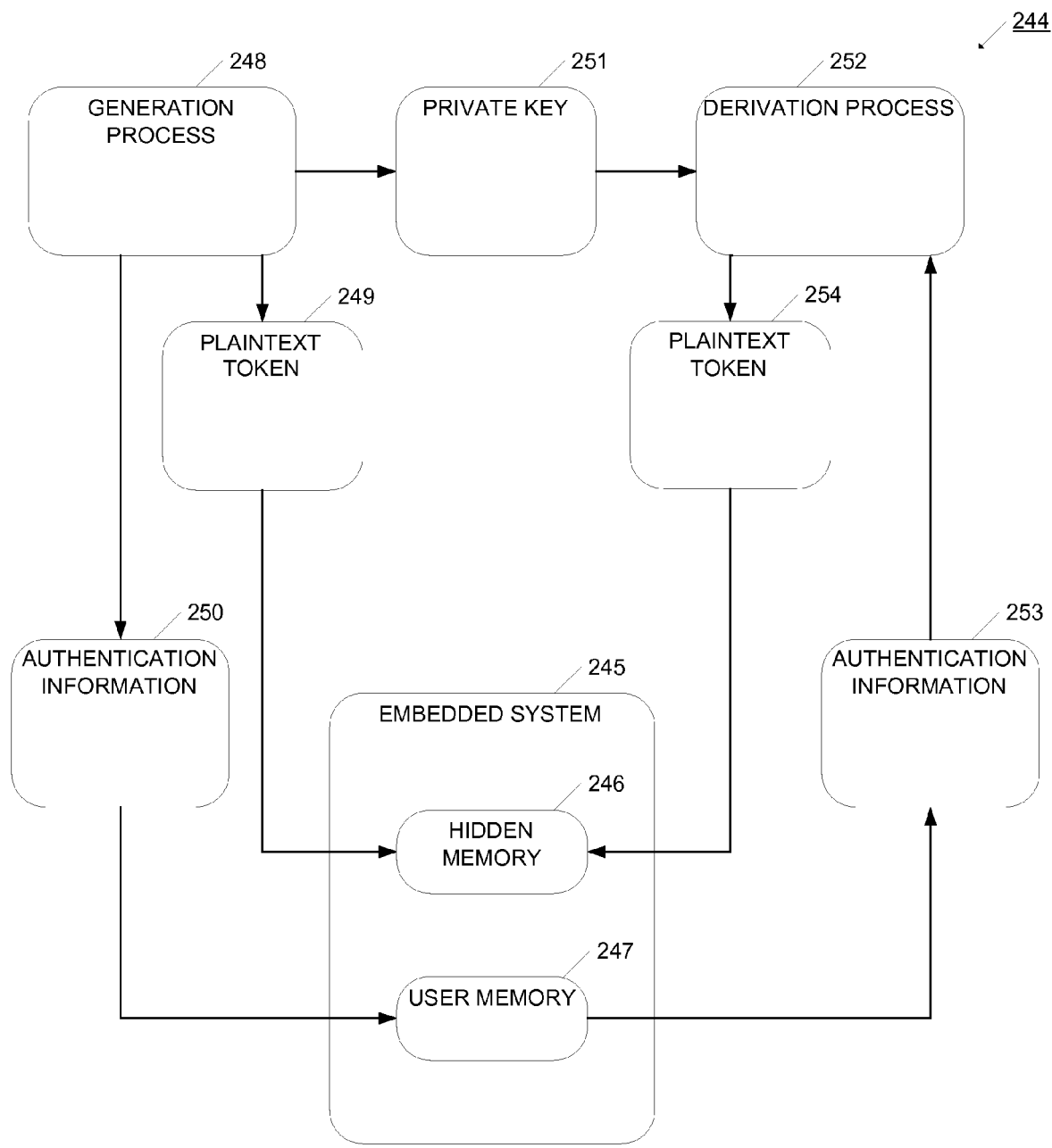
FIG. 8A is a flow diagram of a system for performing an action using an embedded system in accordance with the present invention.

Referring now to FIG. 8A, system 244 for loading and authenticating is illustrated. System 244 makes use of embedded system 245. Embedded system 245 has hidden memory 246 for storing a plaintext token and user memory 247 for storing authentication information. System 244 also has generation process 248. In one example, generation process 248 is performed on a network operations center and a loader. Generation process 248 generates plaintext token 249, authentication information 250, and private key 251. In one example, authentication information 250 comprises an encrypted token and an identification number associated with a public/private key pair. The encrypted token is an encrypted representation of plaintext token 249 and can be decrypted into plaintext token 249 using private key 251. Plaintext token 249 is stored in hidden memory 246 and authentication information 250 is stored in user memory 247.

System 244 has derivation process 252. In one example, derivation process 252 is performed on a network operations center and a reader. Derivation process receives private key 251. In one example, the NOC stores private key 251 during generation process 248 and accesses private key 251 during derivation process 252. Derivation process 252 also receives authentication information 253 from user memory 247 of embedded system 245. In one example authentication information 253 comprises an encrypted token and an identification number corresponding to the public/private key pair used in generation process 248 and derivation process 252. Derivation process uses authentication information 253 to select private key 251 and generate plaintext token 254 by decrypting the encrypted token contained in authentication information 253. Plaintext token 254 is transmitted to embedded system 245 and compared to plaintext 249 stored in hidden memory 246. Embedded system 245 performs an action responsive to the comparison between plaintext token 249 and plaintext token 254.

Figure 8B:
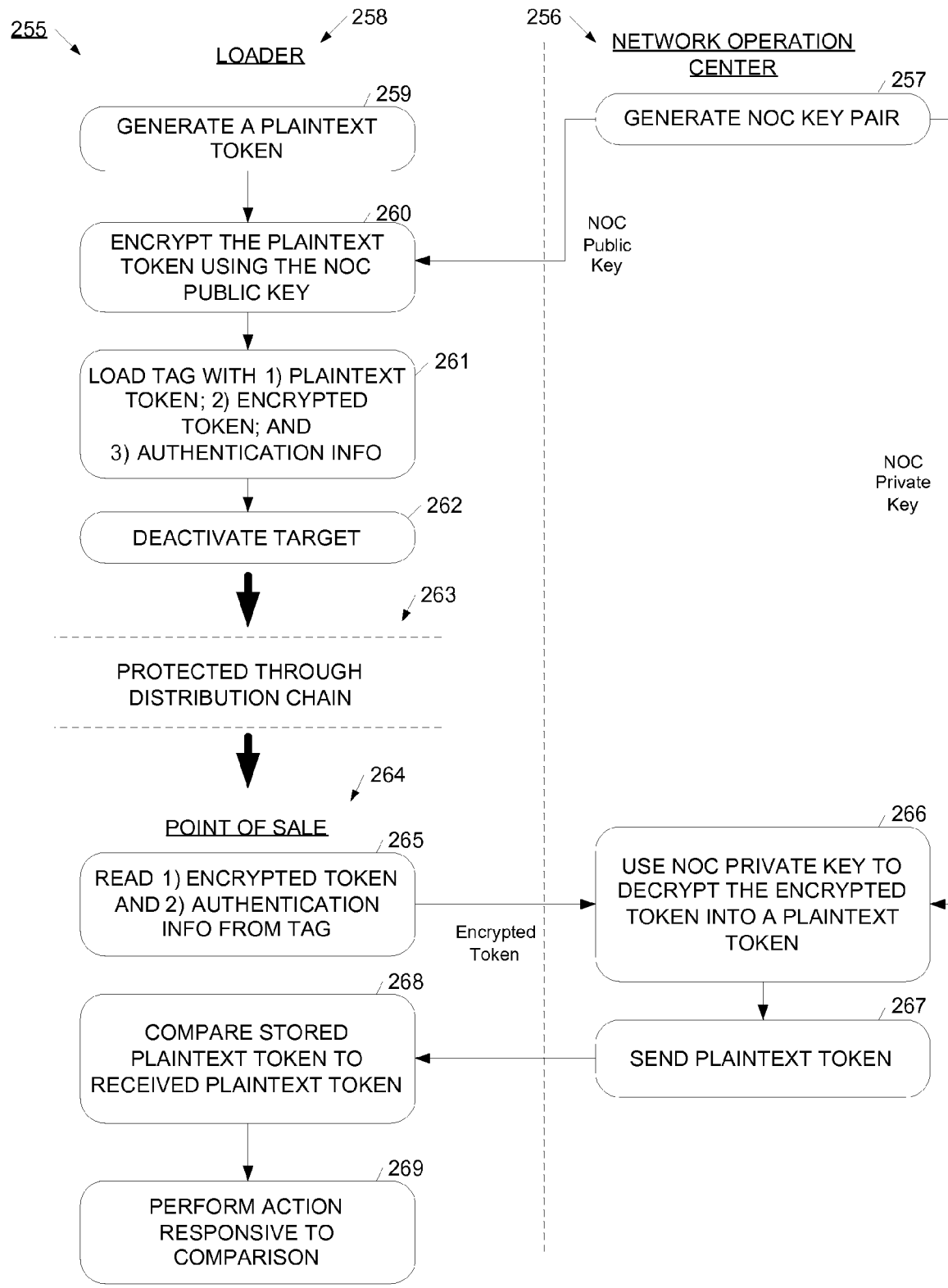
FIG. 8B is a flowchart of a method for performing an action using an embedded system in accordance with the present invention

Referring now to FIG. 8B, method 255 for loading and authenticating is illustrated. Method 255 begins at network operation center 256. NOC 256 generates a public/private key pair as shown in step 257. Method 255 continues on loader 258. Loader 258 generates a plaintext token as shown in step 259. The public key generated by the NOC 257 is transferred to loader 258. Loader 258 generates an encrypted token by encrypting the plaintext token with the public key as shown in step 260. After generating the encrypted token, loader 258 loads the embedded system with the plaintext token and authentication info comprising the encrypted token as shown in step 261. After loading the embedded system on the target, the target is deactivated as shown in step 262. Alternatively, the target begins in a deactivated state.

After loading the embedded processor, the target is sent through the distribution chain as shown in step 263. Advantageously, the entire time the target is in the distribution chain, it is deactivated. If the target is stolen before reaching the point of sale it can not be used. Method 255 continues as the target reaches point of sale 264 and comes in proximity to a reader. The reader reads the authentication information comprising the encrypted token from the embedded system as shown in step 265. The reader then transmits the authentication information to NOC 256. NOC 256 generates a plaintext token by using the private key to decrypt the encrypted token as shown in step 266. After generating the plaintext token, NOC 256 sends the plaintext token back to the reader at the point of sale as shown in step 267. The reader receives the plaintext token and transmits it to the embedded system. The embedded system compares the received plaintext token to the plaintext token stored on the embedded system as shown in step 268. The embedded system performs an action responsive to the comparison as shown in step 269. In one example, the embedded system activates the target if the received plaintext token and the stored plaintext token match.

It will be apparent to one skilled in the art that the systems and methods presented can be applied in a number of ways to secure the actions performed by embedded systems on targets where processing power in the embedded system is limited. In another example, the security of the system and methods for authorizing the actions performed by an embedded system can be enhanced by altering the cryptographic process employed by the network operation center and loader. Advantageously, this change can be made without increasing the amount of processing done by the embedded system or increasing the amount of information stored on the embedded system. This means, for example, that the overall security level or encryption strength may be increased for the overall system, without changes or significant modifications to the processes and structures employed by the embedded system.

Figure 9:
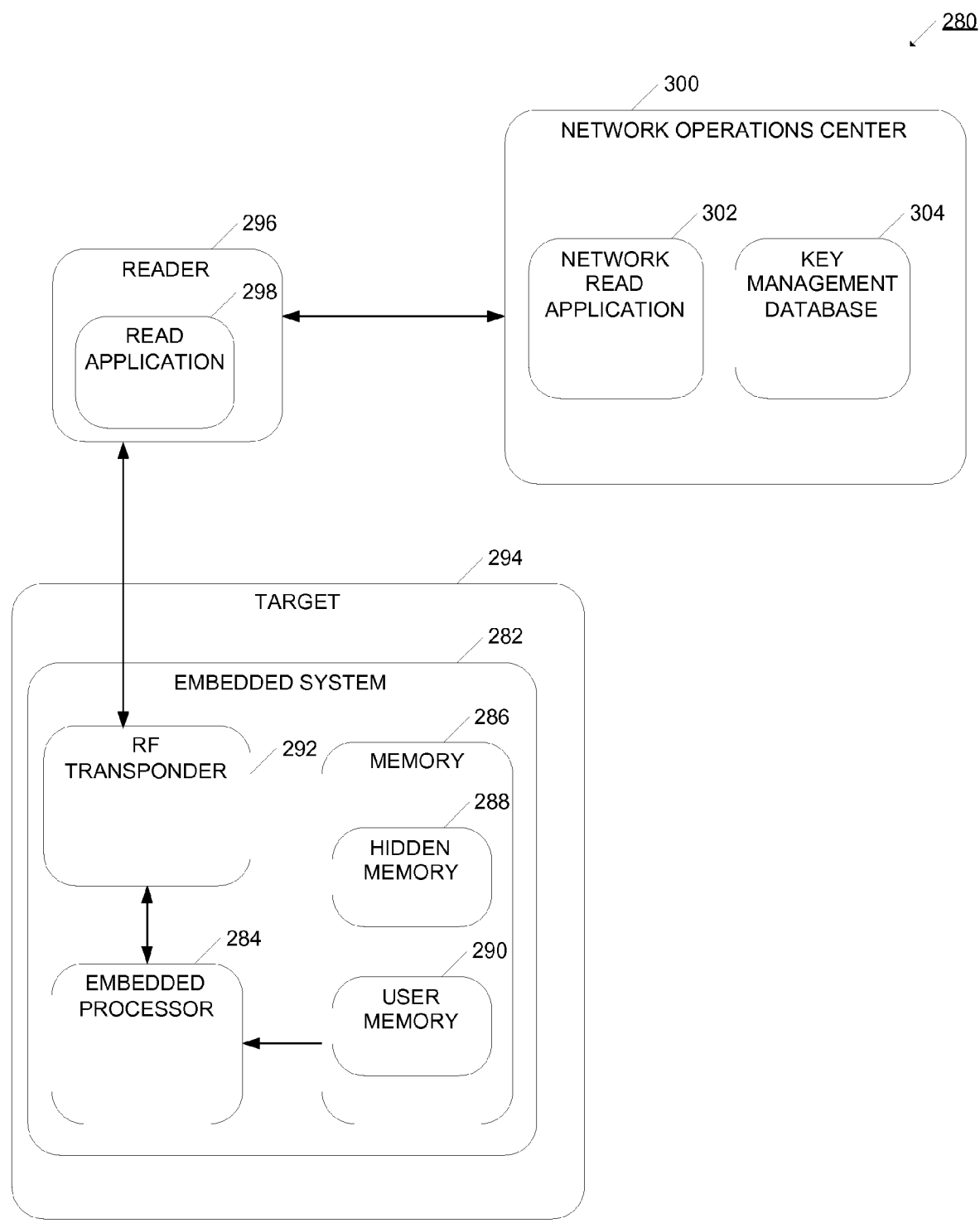
FIG. 9 is a block diagram of a system for authenticating a transaction in accordance with the present invention.

Referring now to FIG. 9, system 280 for authorizing a target is illustrated. It will be appreciated that system 280 is similar to 10 illustrated in FIG. 1, so will be described in less detail. System 280 has embedded system 282. Embedded system 282 comprises embedded processor 284, memory 286, and RF transponder 292. Embedded processor 284 is connected to memory 286. Memory 286 has hidden memory 288 and user memory 290. In one example, the embedded processor 284 may use the contents of hidden memory 288 in making activation decision, but the contents of hidden memory 288 cannot be read externally. In one example hidden memory 288 is a write once memory and can only be read and used by the embedded processor 284. Any other attempted read or use would destroy the hidden memory or other circuit device. In one example, user memory 290 may be written to and read from by the embedded processor, and may be used to hold authentication information, application code, data values, codes, and commands.

System 280 has target 294. It will be understood that target 294 is an article, item, or media. In one example, target 294 is media for storing content such as audio, video, images, codes, and other types of data and information. In one example, target 294 is a compact disc (CD), video disc, digital versatile disc (DVD), laser disc, or hologram. In another example, target 294 is a credit card, driver's license, identification card, security pass, ticket, or coupon. Embedded system 282 is attached to target 294. System 296 also has reader 296. Reader 296 communicates with embedded system 282 via RF transponder 292. In one example, reader 296 is operated by a merchant who sells target 294. Reader 296 may be located at a checkout counter. Read application 298 operates on reader 296. Read application 298 manages the communication between embedded system 282 and network operation center (NOC) 300. NOC 300 operates network read application 302. Network read application 302 manages communication to and from reader 296 and performs functions related to the authentication process. NOC also maintains key management database 304 to enable cryptographic features of the authentication process.

Advantageously, the computationally intensive aspects of the authentication process are handled by NOC 300. Embedded system 282 performs simple comparison operations and reader 296 conveys information between embedded system 282 and NOC 300. By augmenting the security of the encryption process used by NOC 300, the security of the entire authentication process can be increased without altering the complexity of the operations performed by the embedded processor.

Figure 10:
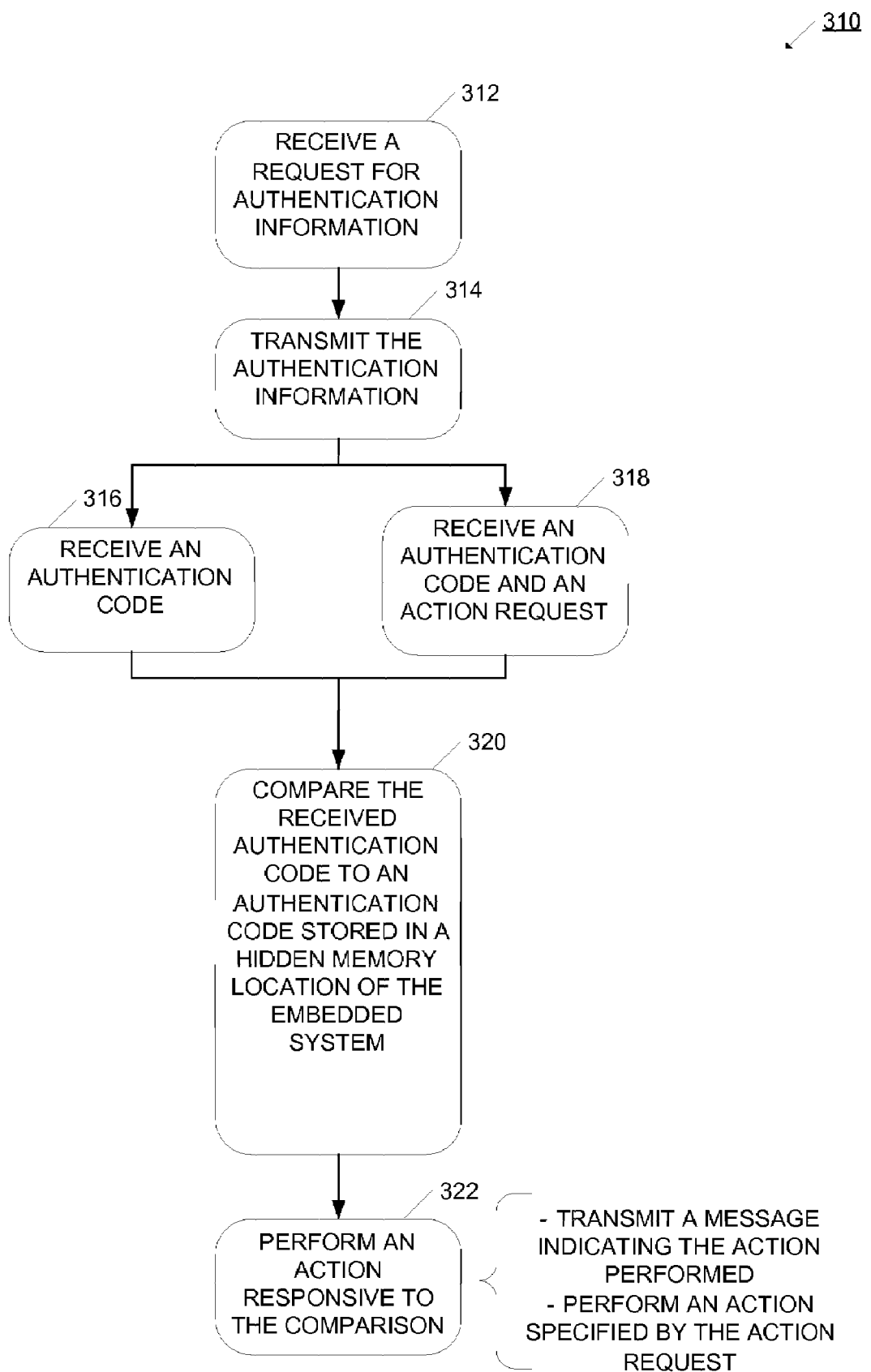
FIG. 10 is a flowchart of a method for performing an action using an embedded system in accordance with the present invention.

Referring now to FIG. 10, method 310 for enabling authentication is illustrated. Method 310 operates on an embedded system and begins when the embedded system receives a request for authentication information as shown in step 312. In one example, the requested authentication information includes an identification number for a manufacturer, an identification number for a merchant, an identification number for a NOC public/private key pair, an identification number for an embedded system, and a tag public key. In one example, the request for authentication information is received by the embedded system from a reader. This request is generated by the reader at the time the target is sold.

After receiving a request for the authentication information, the embedded system accesses the authentication information in user memory and transmits the authentication information to the reader as shown in step 314. It will be understood that the authentication information will have previously been loaded into the user memory of the embedded system. Additionally, it will be understood that an authentication code will have previously been loaded into the hidden memory of the embedded system. In one example, the authentication code is mathematical combination of an identification number for a manufacturer, an identification number for an embedded system, a NOC public key and the tag private key.

After further processing is done external to the embedded system, the embedded system receives an authentication code as shown in step 316. In one example, this external processing is done by the NOC and involves generating an authentication code by mathematically combining an identification number for a manufacturer, an identification number for an embedded system, a NOC private key and the tag public key. Alternatively, the embedded system receives an authentication code and an action request as shown in step 318. In one example, the action request comprises an indication that if the authentication process succeeds, the embedded system should deactivate the target.

After receiving an authentication code, the embedded system compares the received authentication code to an authentication code stored in hidden memory of the embedded system as shown in step 320. It will be appreciated that the comparison may comprise matching the authentication code to the stored authentication code, finding that the received authentication code and the stored authentication code do not match, or using logical steps in comparing the received authentication code and the stored authentication code.

After performing the comparison, the embedded system will perform an action responsive to the comparison as shown in step 322. In one example, the action performed if the received authentication code and the stored authentication code match is activation of the target. In another example, no action is performed if the received authentication code and the stored authentication code do not match. In another example, the embedded system transmits a message indicating the action the embedded system performed or the result of the comparison. In another example, the embedded system performs the action specified in an action request reactant to the result of the comparison.

Figure 11:
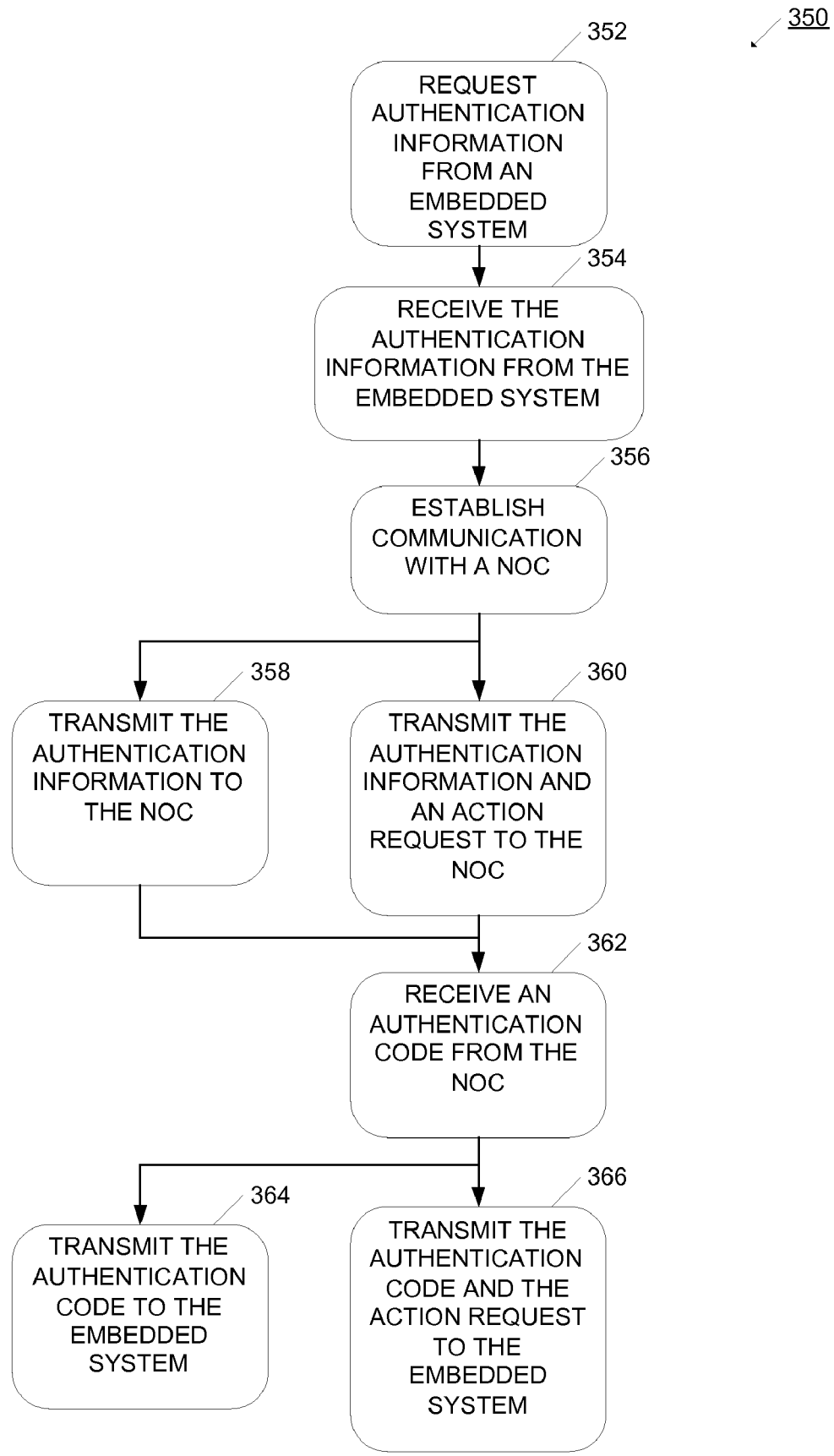
FIG. 11 is a flowchart of a method for authenticating a transaction using an RF reader in accordance with the present invention.

Referring now to FIG. 11, method 350 for enabling authentication is illustrated. Method 350 operates on a reader. In one example, method 350 will be executed when the target is brought to a point of sale. Method 350 begins when the reader requests authentication information from an embedded system as shown in step 352. In one example, the authentication information comprises a tag public key, a manufacturer ID, a merchant ID, a NOC public/private key pair ID, and an embedded system ID.

After the request for authentication information is made, the reader receives the authentication information from the embedded system as shown in step 354. After receiving the authentication information, the reader establishes communication with a network operation center as shown in step 356. After establishing a connection with the NOC, the reader transmits the authentication information to the NOC as shown in step 358. Alternatively, the reader transmits the authentication information and an action request to the NOC as shown in step 360. After more processing done external to the reader, the reader receives an authentication code from the NOC as shown in step 362. After receiving the authentication code from the NOC, the reader transmits the authentication code to the embedded system as shown in step 364. Alternatively, the reader transmits the authentication code and the action request to the embedded system as shown in step 366.

Figure 12:
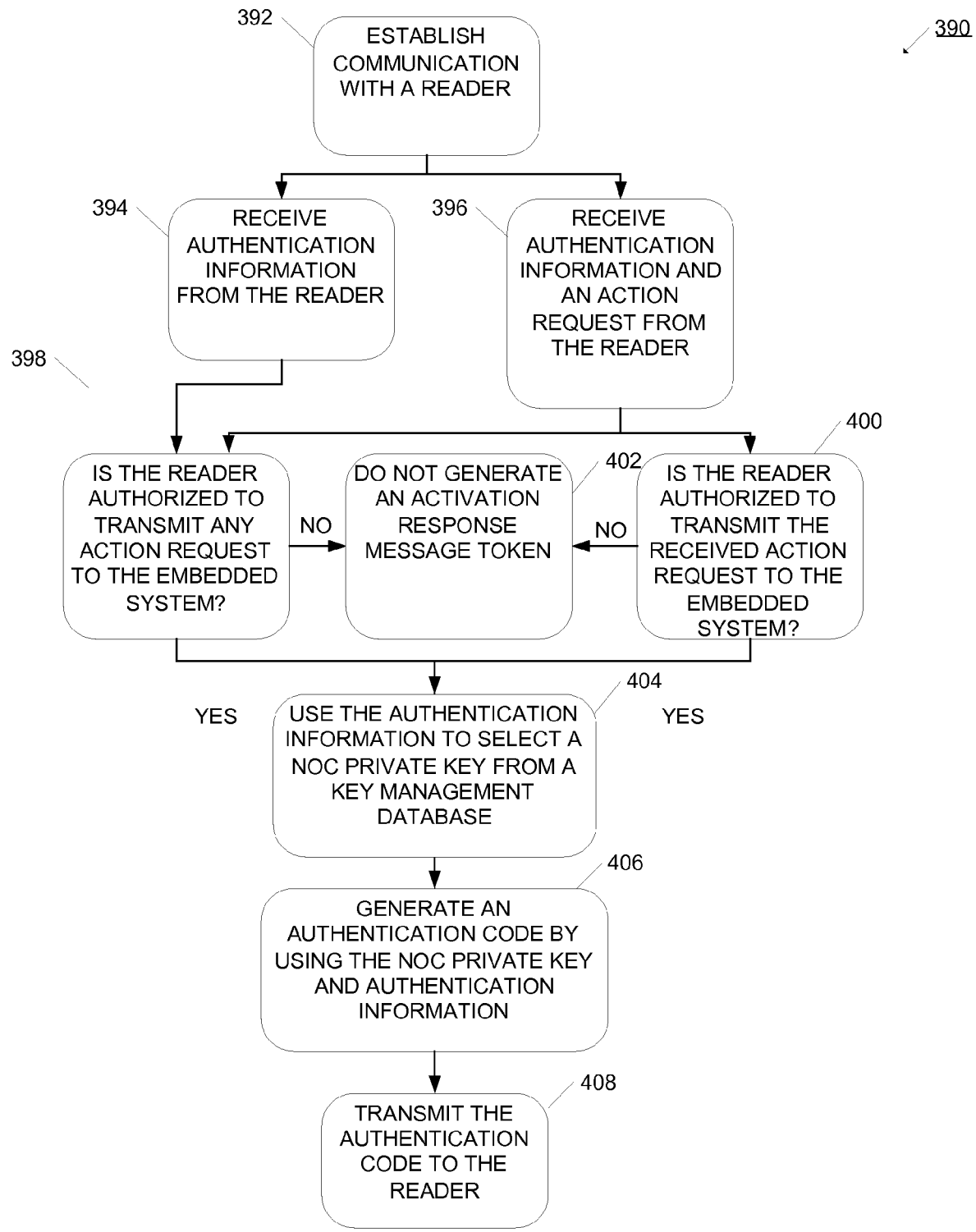
FIG. 12 is a flowchart of a method for authenticating a transaction using a network operation center in accordance with the present invention.

Referring now to FIG. 12, method 390 for enabling authentication is illustrated. Method 390 operates on a network operations center and begins when the NOC establishes communication with a reader as shown in step 392. In one example, this occurs when a target is brought to a reader at a point of sale and the reader contacts the NOC. In another example, the process of establishing communication with a reader involves receiving identifying information about the reader such as a unique identification number. After establishing communication with a reader, the NOC receives authentication information from the reader as shown in step 394. Alternatively, the NOC receives both the authentication information and an action request from the reader as shown in step 396. In one example the authentication information comprises a tag public key, a manufacturer ID, a merchant ID, a NOC public/private key pair ID, and an embedded system ID.

After receiving the authentication information, the NOC determines if the reader is authorized to transmit action requests to the embedded system as shown in step 398. Alternatively, the NOC determines if the reader is authorized to send the received action request to the embedded system as shown in step 400. If the reader is not authorized to send any action request to the embedded system or the reader is not authorized to send the received action request to the embedded system, the NOC does not generate an authentication code as shown in step 402. This effectively ends the authentication process. However, if the NOC determines that the reader is authorized to send action requests, or the received action request, to the embedded system, the NOC proceeds to use the authentication information received from the reader to select a NOC private key from a key management database as shown in step 404. In one example, the key management database contains public/private key pairs indexed by a tuple of a manufacturer ID, a merchant ID, and a NOC public/private key pair ID.

Having selected the appropriate NOC private key, the NOC generates an authentication code as shown in step 406. In one example, the NOC generates an authentication code by mathematically combining a NOC private key, a tag public key, an embedded system ID number, and a manufacturer ID number. In one example the NOC private key is stored in a database maintained by the NOC and the other information used to generate the authentication code is transmitted to the NOC by the reader in the authentication information. In one example the NOC private key is an integer and the tag public key is a point on an elliptical curve. The NOC generates an authentication code by multiplying the NOC private key and the tag public key together, hashing the result of the multiplication, and combining the result of the hash with parts of the embedded system ID number and the manufacturer ID number. After generating the authentication code, the NOC transmits the authentication code to the reader as shown in step 408.

Generating the authentication code in this manner provides multiple advantages. First, using the elliptical cryptographic method provides greater security per bit than other methods of encryption. Greater security can be achieved without increasing the number of bits stored on the embedded system. Second, because the authentication code is generated using meaningful information, it is possible to detect certain attempts to compromise the security of the authentication process. Persons attempting to determine the process for generating authentication codes might contact a NOC pretending to be a valid reader. These persons could request a vast number of authentication codes based on different inputs and attempt to determine the algorithm from the outputs. However, because the authentication code is composed of meaningful information, the NOC can detect when it generates an authentication code that can not be valid. If the NOC determines that a reader is sending authentication information that results in invalid authentication codes, the NOC can refuse to communicate with the reader or take other steps to defeat the attempt to compromise the security of the authentication process. The use of elliptical curve cryptography increases the security of the authentication process without requiring additional processing at the embedded processor or increasing the amount of information it stores.

Figure 13:
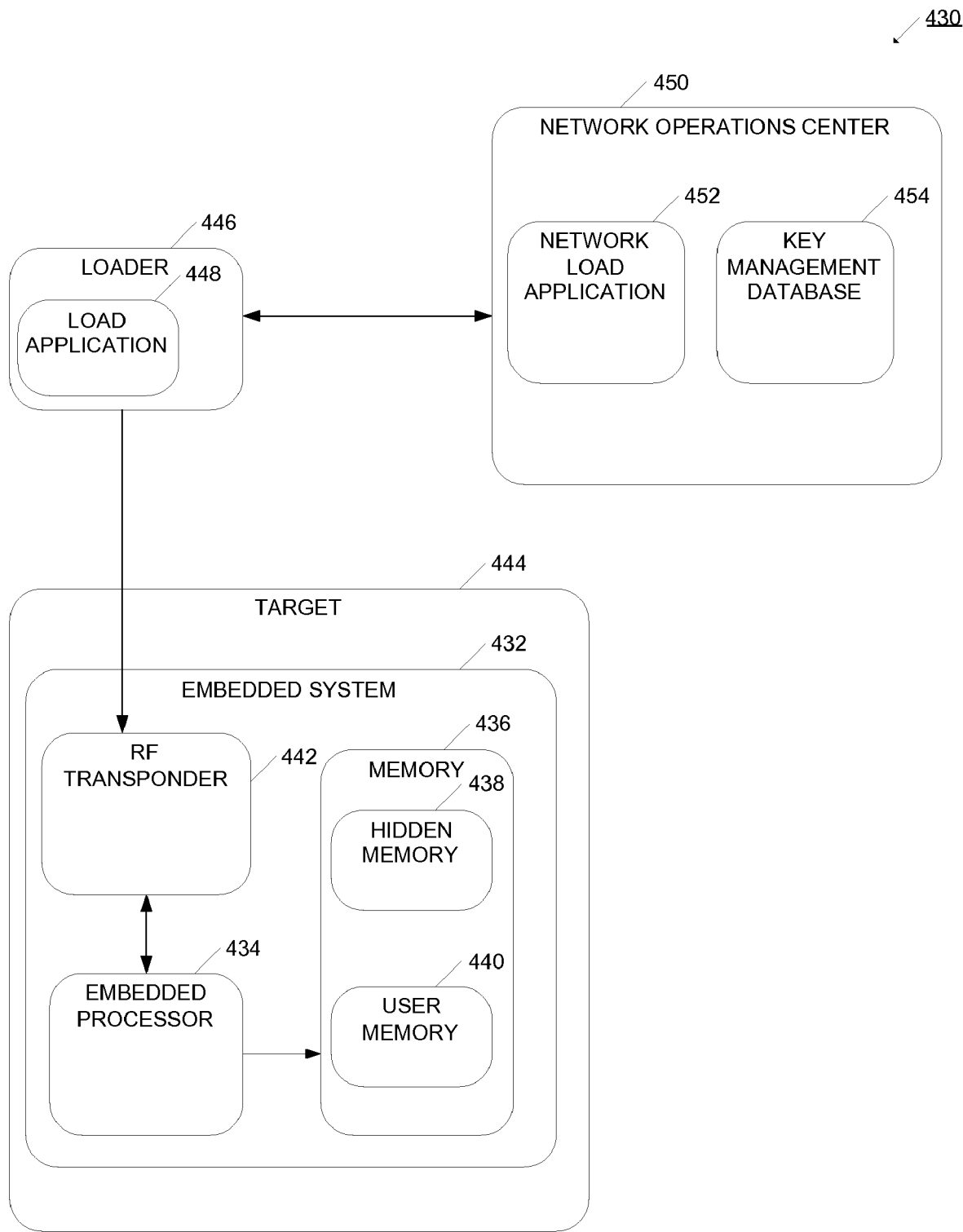
FIG. 13 is a block diagram of loading an embedded processor system in accordance with the present invention.

Referring now to FIG. 13, system 430 for loading an embedded processor is illustrated. It will be appreciated that system 430 is similar to system 160 of FIG. 5. System 430 is used to preload embedded system 432 with an authentication code and authentication information to enable subsequent secure authentication. The computationally intensive portions of the cryptographic process are performed at NOC 450 and loader 446 to enable secure authentication with minimal computation at the embedded system. Embedded system 432 has embedded processor 434, memory 436 and RF transponder 442. Memory 436 further comprises hidden memory 436 and user memory 440. It will be understood that embedded system 432 is similar to embedded system 282 described in FIG. 9. Embedded system 432 is attached to target 444. It will be understood that target 444 is similar to target 294 in FIG. 9. Target 444 may be, for example, a CD, DVD, HD DVD, Blu-Ray DVD, or gaming disc.

System 430 also has loader 446. Loader 446 is used to transmit the authentication code and authentication information to embedded system 432. In one example, loader 446 is a device located at the manufacturing site of target 444. In another example loader 446 is a device located at the manufacturing site of embedded system 432. In a third example, loader 446 is a device located at the site where embedded system 432 is linked to target 444. Loader 446 enables communication between embedded system 432 and NOC 450. Loader 446 operates load application 448. Load application 448 performs functions related to the load process. NOC 450 operates network load application 452. Network load application 452 handles communication to and from loader 446 and performs a portion of the computationally intensive cryptographic process to enable secure authentication with minimal computation at the embedded processor. NOC 450 also maintains key management database 454 to enable cryptographic features of the authentication process. It will be appreciated that system 430 enables the pre-loading of the embedded system to enable secure authentication.

Figure 14:
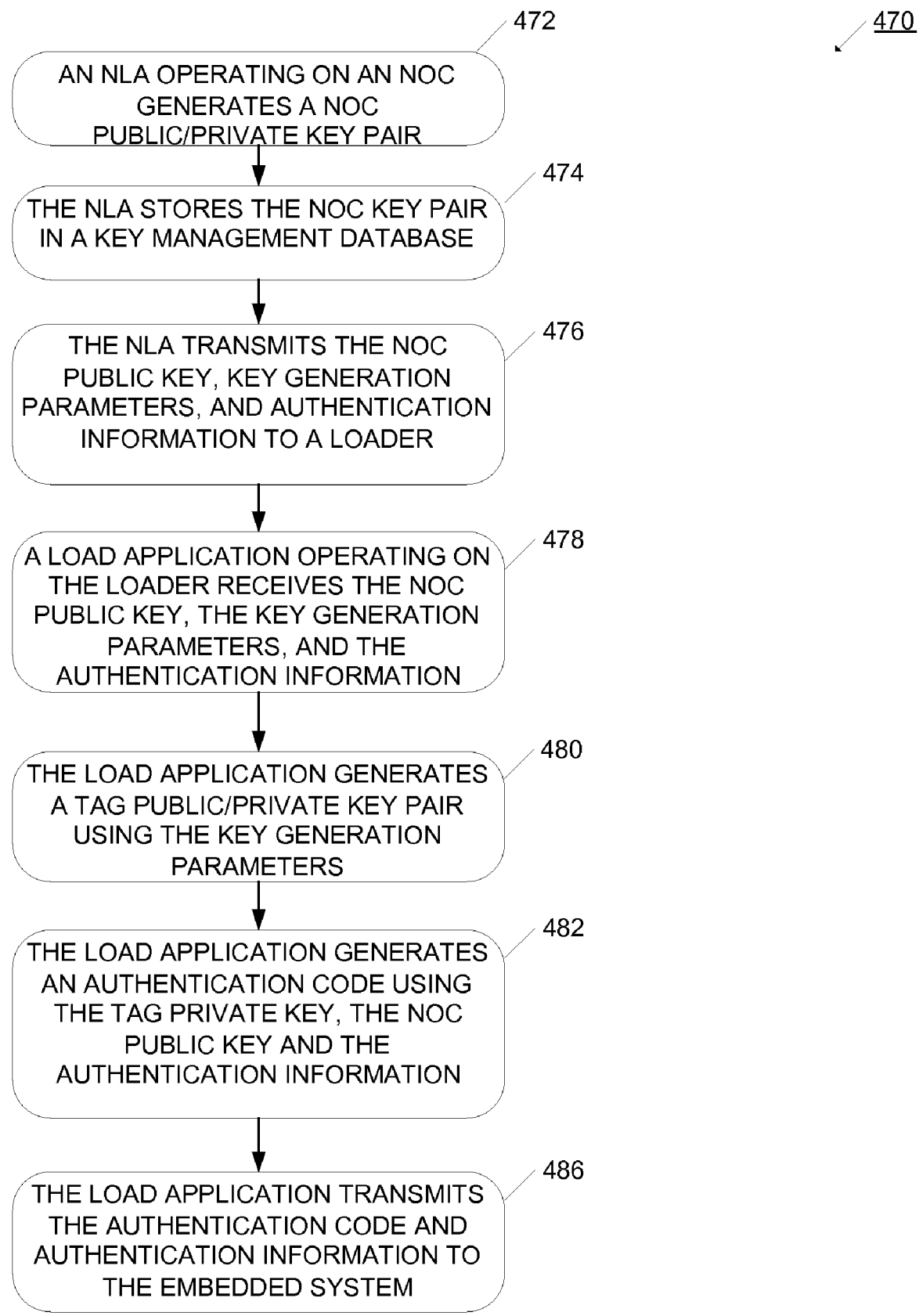
FIG. 14 is a flowchart of a process for loading an embedded processor system in accordance with the present invention.

Referring now to FIG. 14, method 470 for loading an embedded system is illustrated. Method 470 involves the operation of system 430 from FIG. 13. The execution of method 470 results in a loaded embedded system that can be subsequently used in secure authentication. Method 470 begins when the network load application (NLA) operating on a NOC generates a NOC public/private key pair as shown in step 472. In one example, the NLA generates a key pair responsive to a request from a loader. In one example, the NOC private key is an integer and the NOC public key is a point on an elliptical curve. The NOC key pair is generated by selecting an elliptical curve with generator (base point) G and order n. The NOC public/private key pair is defined by the relationship: (NOC public key)=(NOC private key)●·(G) where the operation operating on the NOC private key and G is multiplication as defined for elliptical curve cryptography. After generating the key pair, the NLA stores the NOC key pair in the key management database as shown in step 474. In one example, the NOC key pair is stored according to a tuple of a manufacturer ID number, a merchant ID number, and an embedded system ID number. In another example, only the NOC private key is stored in the key management database. After storing the NOC key pair, the NLA transmits the NOC public key, the key generation parameters G and n, and other authentication information to a loader as shown in step 476. In one example the other authentication information includes the ID number associated with the NOC public/private key pair, a manufacturer ID number, a merchant ID number, and an embedded system ID number.

After the NLA transmits the information to a loader, the load application operating on the loader receives the NOC public key, key generation parameters, and other authentication information as shown in step 478. The load application generates a tag public/private key pair using the key generation parameters supplied by the NOC as shown in step 480. The tag public/private key pair plaintext token is generated using the same mathematical relationship: (tag public key)=(tag private key)●(G). It will be appreciated that because of the way the NOC and tag key pairs were generated, the product of the tag private key and the NOC public key is equal to the product of the NOC private key and the tag public key.

After generating the tag public/public key pair, the load application generates an authentication code by combining the tag private key, the NOC public key, a manufacturer ID and an embedded system ID as shown in step 482. In one example, the activation code is generated by multiplying the tag private key and the NOC public key, hashing the result, and combining the result of the hash with parts of the manufacturer ID and embedded system ID. After generating an authentication code, the loader transmits the authentication code and other authentication information to the embedded processor as shown in step 486. In one example the authentication information comprises the tag public key, a manufacturer ID, a merchant ID, an embedded system ID, and a NOC public/private key pair ID. Advantageously method 470 allows for an extremely sophisticated encryption scheme to be used on the embedded system without the use of intensive computation at the embedded processor. The load process of method 470 allows an even more sophisticated encryption scheme that provides greater security per bit than traditional encryption schemes without increasing the complexity of the computation performed at the embedded processor. Further, because the authentication code is generated from meaningful information, attempts to crack the encryption method by building a library of authentication codes generated by different inputs can be recognized and thwarted.

Figure 15:
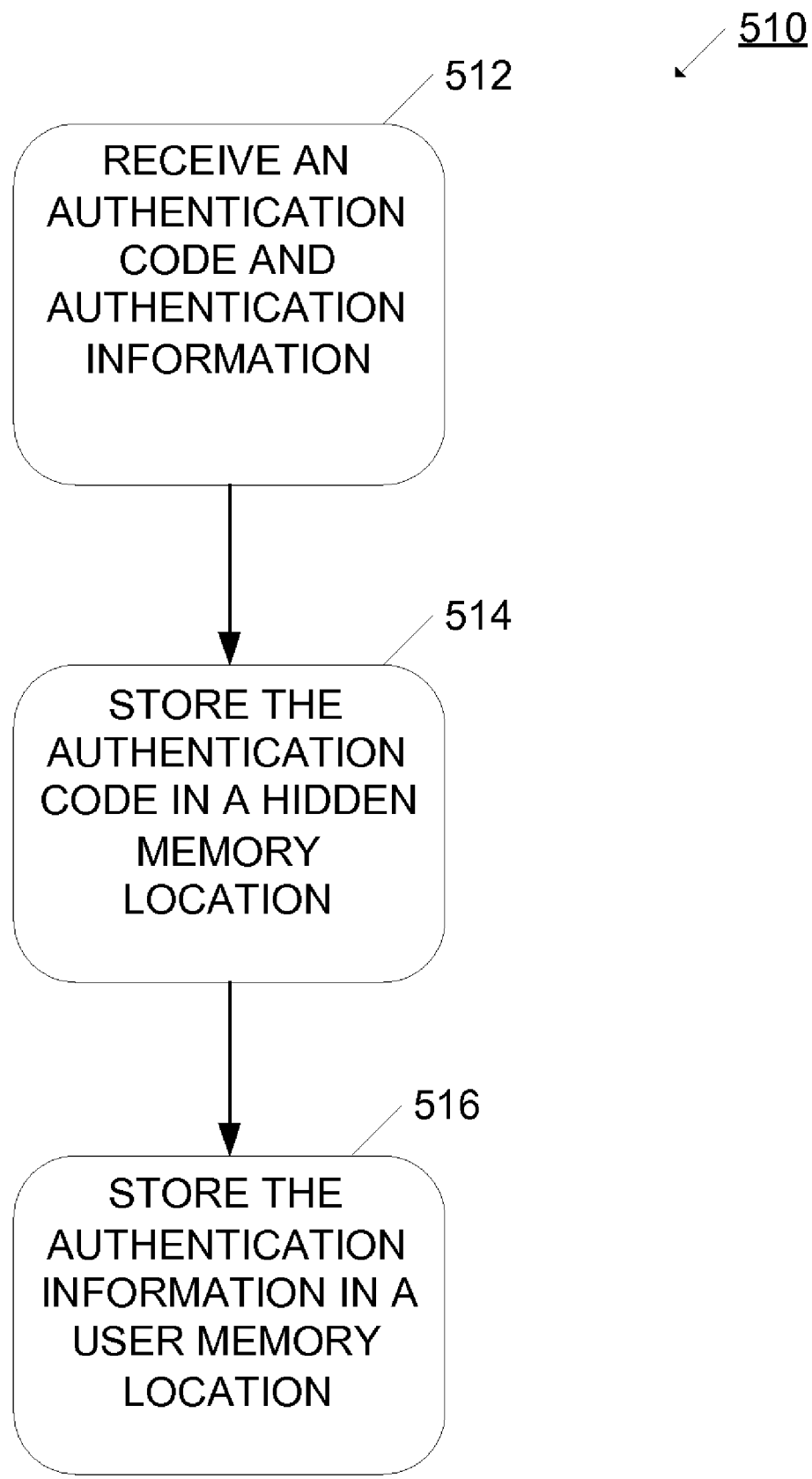
FIG. 15 is a flowchart of a process for loading an embedded processor system in accordance with the present invention.

Referring now to FIG. 15, method 510 for enabling the load process is illustrated. Method 510 operates on an embedded system. In one example, method 510 is executed at the manufacturing site of a target when the target is brought into proximity of the loader. Method 510 begins when the embedded system receives an authentication code and authentication information as shown in step 512. In one example, the authentication information comprises a tag public key, a manufacturer ID, a merchant ID, an embedded processor ID, and an identification number associated with a NOC public/private key pair. After receiving the authentication code and authentication information, the embedded system stores the authentication code in a hidden memory as shown in step 514. In one example, the hidden memory is a write once memory and once the authentication code has been written there, the contents of the hidden memory can no longer be changed. After storing the authentication code in hidden memory, the embedded system stores the authentication information in user memory as shown in step 516. At this point, the loading process is complete.

Figure 16A:
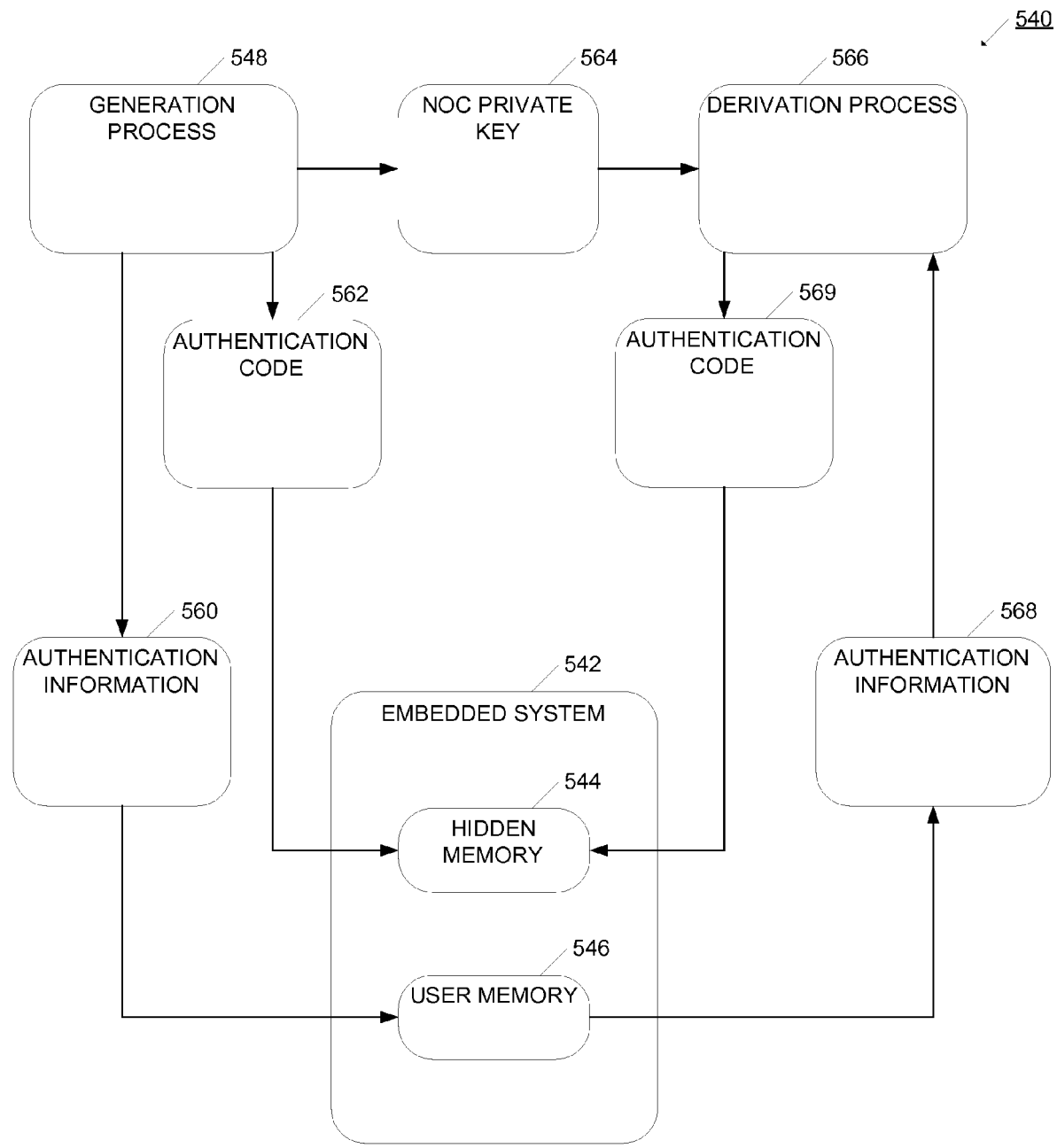
FIG. 16A is a flow diagram of a system for performing an action using an embedded system in accordance with the present invention.

Referring now to FIG. 16A, system 540 for loading and authenticating is illustrated. System 540 makes use of embedded system 542. Embedded system 542 has hidden memory 544 for storing an authentication code and user memory 546 for storing authentication information. System 540 also has generation process 548. In one example, generation process 548 is performed on a network operations center and a loader. Generation process 548 generates authentication code 562, authentication information 560, and NOC private key 564. In one example, the generation process proceeds according to method 470 in FIG. 14. In one example, authentication information 560 comprises a tag public key, a manufacturer ID, a merchant ID, the ID of embedded system 542, and an identification number associated with the NOC public/private key pair. Authentication code 562 is stored in hidden memory 544 and authentication information 560 is stored in user memory 546.

System 540 has derivation process 566. In one example, derivation process 566 is performed on a network operations center and a reader. Derivation process 566 receives NOC private key 564. In one example, the NOC stores NOC private key 564 during generation process 548 and accesses NOC private key 564 during derivation process 566. Derivation process 566 also receives authentication information 568 from user memory 546 of embedded system 542. In one example authentication information 568 comprises a tag public key, a manufacturer ID, a merchant ID, the ID of embedded system 542, and an identification number associated with the NOC public/private key pair. Derivation process 566 uses authentication information 568 to select private key 564 and generate authentication code 569. In one example, authentication code 569 is generated according to step 406 of method 390 in FIG. 12. Authentication code 569 is transmitted to embedded system 542 and compared to authentication code 562 stored in hidden memory 544. Embedded system 542 performs an action responsive to the comparison between authentication code 569 and authentication code 562.

Figure 16B:
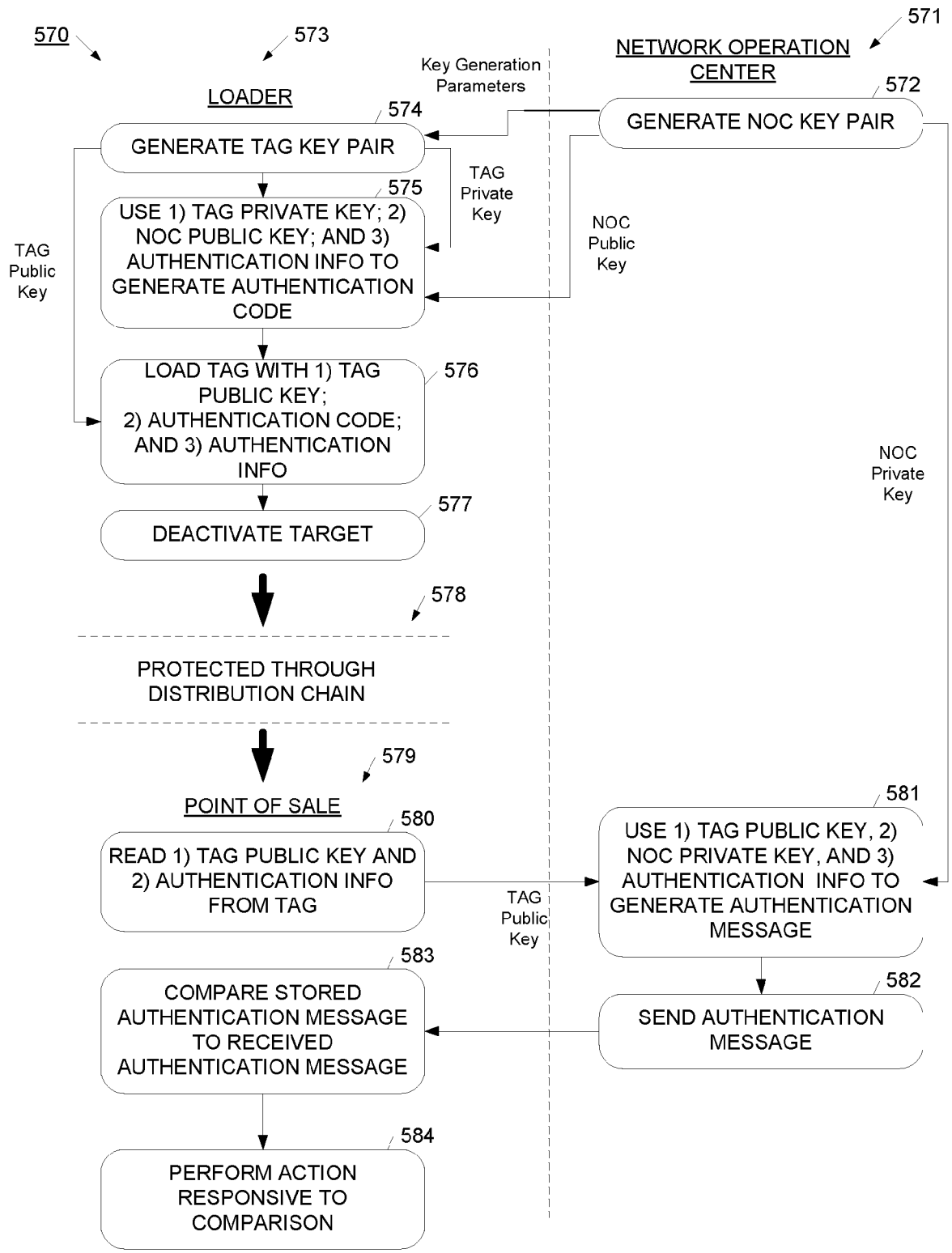
FIG. 16B is a flowchart of a method for performing an action using an embedded system in accordance with the present invention.

Referring now to FIG. 16B, method 570 for loading and authenticating is illustrated. Method 570 begins at network operation center 571. NOC 256 generates a NOC public/private key pair using key generation parameters as shown in step 572. NOC 572 transfers both the key generation parameters and the NOC public key to loader 573. Loader 573 generates a tag public/private key pair using the key generation parameters as shown in step 574. The loader then uses the tag private key, NOC public key, and other authentication information to generate an authentication code as shown in step 575. Next, loader 573 loads the embedded system with the authentication code, the tag public key, and other authentication information as shown in step 576. After loading the embedded system on the target, the target is deactivated as shown in step 577. Alternatively, the target leaves the manufacturing process in a deactivated state.

After the embedded processor is loaded, the target is sent through the distribution chain as shown in step 578. Advantageously, the entire time the target is in the distribution chain, it is deactivated. If the target is stolen before reaching the point of sale it cannot be used. Method 570 continues as the target reaches point of sale 579 and comes in proximity to a reader. The reader reads the authentication information (including the tag public key) from the embedded system as shown in step 580. The reader then transmits the authentication information to NOC 571. NOC 571 generates an authentication code using the tag public key, the NOC private key, and other authentication information from the embedded system as shown in step 581. After generating the authentication code, NOC 571 sends the authentication code back to the reader at the point of sale as shown in step 582. The reader receives the authentication code and transmits it to the embedded system. The embedded system compares the received authentication code to the authentication code on the embedded system as shown in step 583. The embedded system performs an action responsive to the comparison as shown in step 584. In one example, the embedded system activates the target if the received plaintext token and the stored plaintext token match.

It will be appreciated by one skilled in the art that the cryptographic processes described herein may be used in conjunction with the systems and method described herein to secure authentication for an embedded system without requiring sophisticated computation on the embedded system. However, the present system and methods are not tied to any particular cryptographic scheme. Advantageously, the present systems and methods for securing the actions of an embedded system may be practiced using a variety of cryptographic schemes. The present systems and methods provide great flexibility in determining the appropriate cryptographic process for a particular application. The changes to the cryptographic scheme may be performed without changes or significant alteration to the embedded system and supporting systems or methods. Accordingly, it is possible to describe the function of the present systems and methods in reference to a more general process for securing the authentication process.

Figure 17:
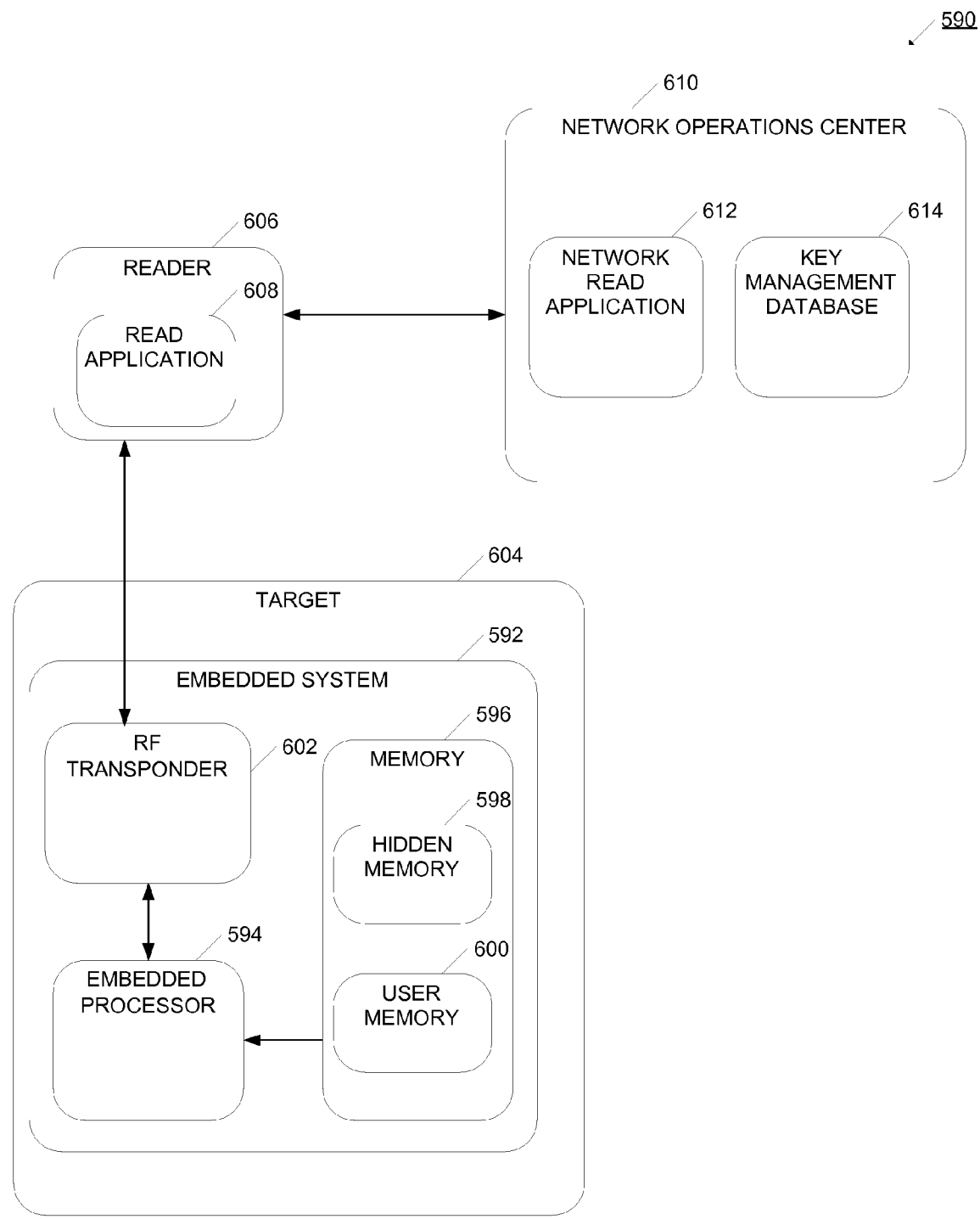
FIG. 17 is a block diagram of a system for authenticating a transaction in accordance with the present invention.

Referring now to FIG. 17, system 590 for authorizing a target is illustrated. It will be appreciated that system 590 is similar to system 280 illustrated in FIG. 9, so will be described in less detail. System 590 has embedded system 592. Embedded system 592 comprises embedded processor 594, memory 596, and RF transponder 602. Embedded processor 594 is connected to memory 596. Memory 596 has hidden memory 598 and user memory 600.

System 590 has target 604. It will be understood that target 604 is an article, item, or media. In one example, target 604 is media for storing content such as audio, video, images, codes, and other types of data and information. In one example, target 604 is a compact disc (CD), video disc, digital versatile disc (DVD), laser disc, or hologram. In another example, target 604 is a credit card, driver's license, identification card, security pass, ticket, or coupon. Embedded system 592 is attached to target 504. System 590 also has reader 606. Reader 606 communicates with embedded system 592 via RF transponder 602. Read application 608 operates on reader 606. Read application 608 manages the communication between embedded system 592 and network operation center (NOC) 610. NOC 610 operates network read application 612. Network read application 613 manages communication to and from reader 606 and performs functions related to the authentication process. NOC also maintains key management database 614 to enable cryptographic features of the authentication process. Advantageously, the computationally intensive aspects of the authentication process are handled by NOC 610. Embedded system 592 performs simple comparison operations and reader 606 conveys information between embedded system 592 and NOC 610.

Figure 18:
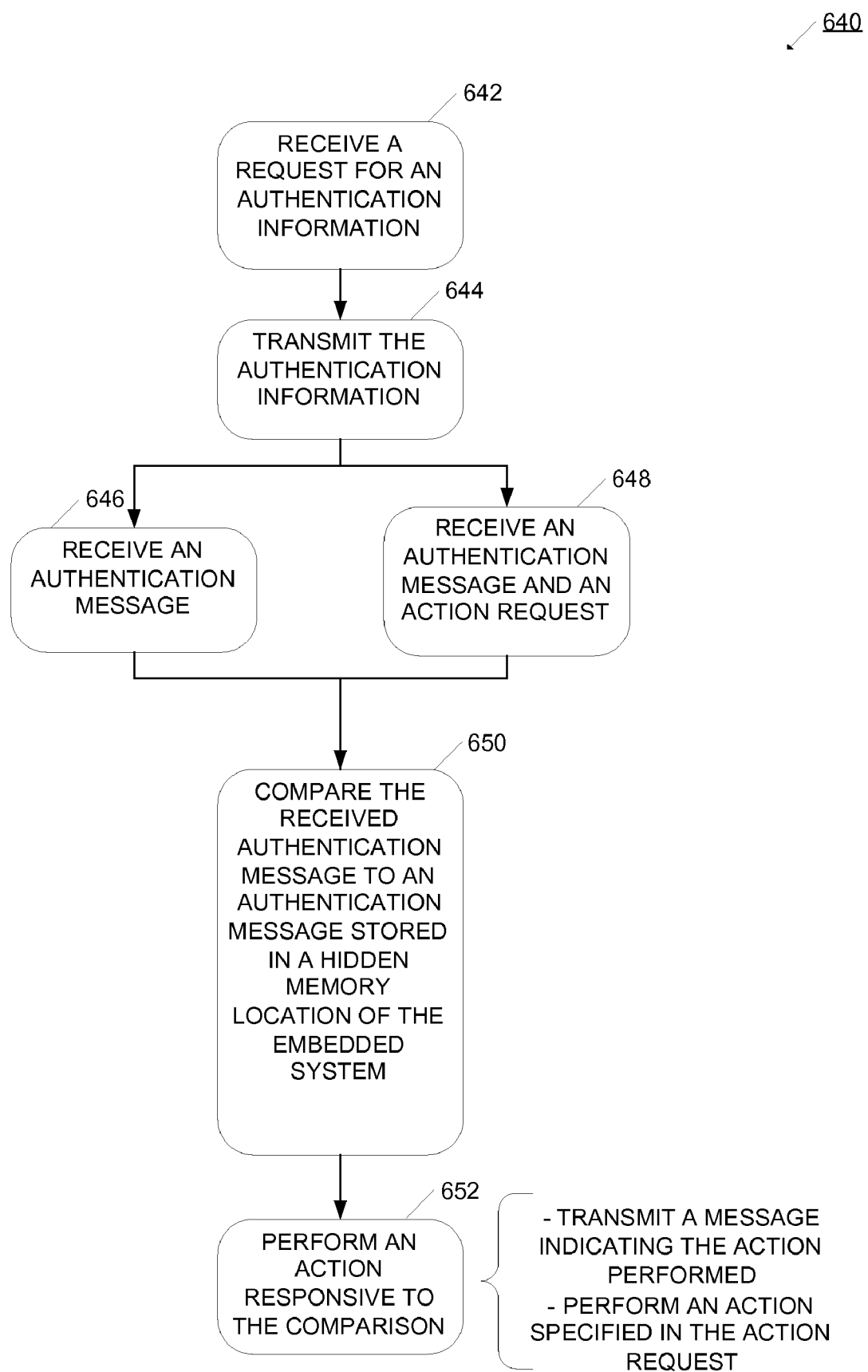
FIG. 18 is a flowchart of a method for performing an action using an embedded system in accordance with the present invention.

Referring now to FIG. 18, method 640 for enabling authentication is illustrated. Method 640 operates on an embedded system. In one example, method 640 is executed at the time a target is brought to a point of purchase. Method 640 begins when the embedded system receives a request for authentication information as shown in step 642. It will be appreciated that the requested authentication information is any one or more pieces of data that are necessary but, without further information, insufficient to enable the quick computation of an authentication message. It will be appreciated that an authentication message is a series of bits that may or may not have meaning. In one example, an authentication message is a plaintext token. In another example, an authentication message is an authentication code. After receiving a request for the authentication information, the embedded system accesses the authentication information in user memory and transmits the authentication information to the reader as shown in step 644. It will be understood that the authentication information will have previously been loaded into the user memory of the embedded system. Additionally, it will be understood that the authentication message will have previously been loaded into the hidden memory of the embedded system.

After further processing is done external to the embedded system, the embedded system receives an authentication message as shown in step 646. In one example, this external processing is done by the NOC and involves generating an authentication message by combining the authentication information from the embedded system with other information stored on the NOC. Alternatively, the embedded system receives an authentication message and an action request as shown in step 648. In one example, the action request comprises an indication that if the authentication process succeeds, the embedded system should deactivate the target. After receiving an authentication message, the embedded system compares the received authentication message to an authentication message stored in hidden memory of the embedded system as shown in step 650. It will be appreciated that the comparison may comprise matching the received authentication message to the stored authentication message, finding that the received authentication message and the stored authentication message do not match, or using logical steps in comparing the received authentication message and the stored authentication message.

After performing the comparison, the embedded system will perform an action responsive to the comparison as shown in step 652. In one example, the action performed if the received authentication message and the stored authentication message match is activation of the target. In another example, no action is performed if the received authentication message and the stored authentication message do not match. In another example, the embedded system transmits a message indicating the action the embedded system performed or the result of the comparison. In another example, the embedded system performs the action specified in an action request reactant to the result of the comparison.

Figure 19:
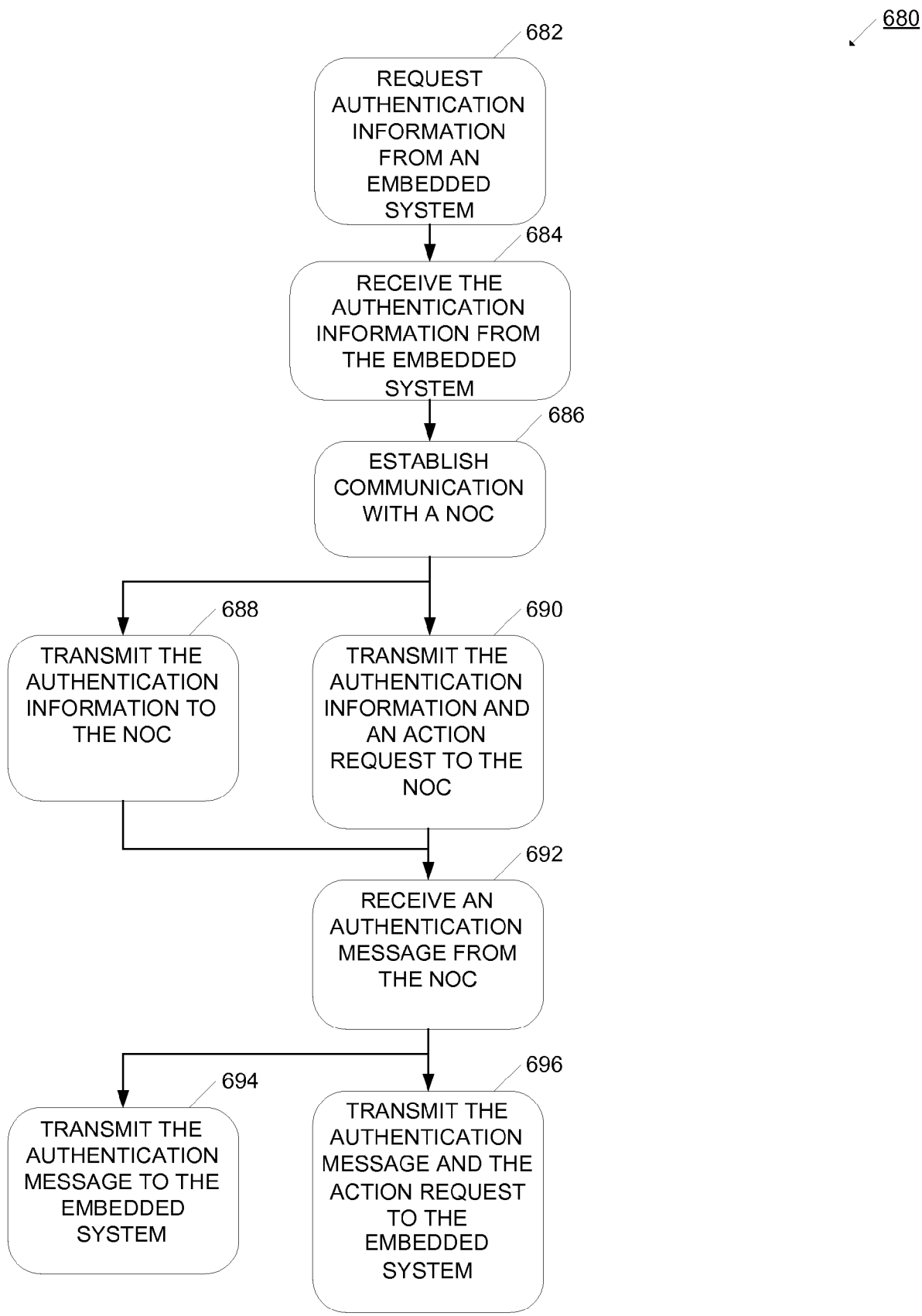
FIG. 19 is a flowchart of a method for authenticating a transaction using an RF reader in accordance with the present invention.

Referring now to FIG. 19, method 680 for enabling authentication is illustrated. Method 680 operates on a reader. In one example, method 680 will be executed when the target is brought to a point of sale. Method 680 begins when the reader requests authentication information from an embedded system as shown in step 682. In one example, the authentication information may include a tag public key, an encrypted token, a manufacturer ID, a merchant ID, a NOC public/private key pair ID, and an embedded system ID.

After the request for authentication information is made, the reader receives the authentication information from the embedded system as shown in step 684. After receiving the authentication information, the reader establishes communication with a network operation center as shown in step 686. After establishing a connection with the NOC, the reader transmits the authentication information to the NOC as shown in step 688. Alternatively, the reader transmits the authentication information and an action request to the NOC as shown in step 690. After more processing done external to the reader, the reader receives an authentication message from the NOC as shown in step 692. After receiving the authentication code from the NOC, the reader transmits the authentication message to the embedded system as shown in step 694. Alternatively, the reader transmits the authentication message and the action request to the embedded system as shown in step 696.

Figure 20:
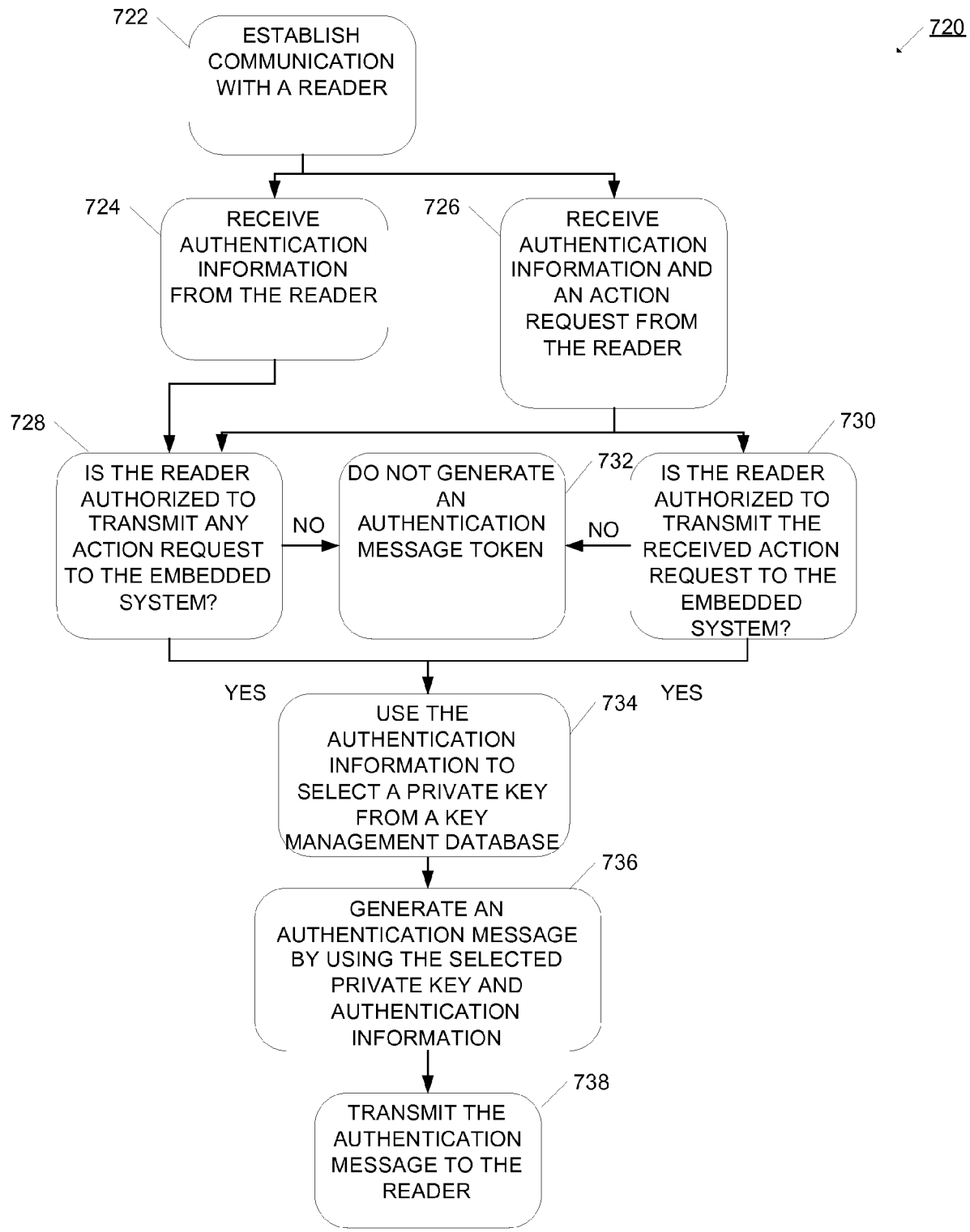
FIG. 20 is a flowchart of a method for authenticating a transaction using a network operation center in accordance with the present invention.

Referring now to FIG. 20, method 720 for enabling authentication is illustrated. Method 720 operates on a network operations center and begins when the NOC establishes communication with a reader as shown in step 722. In one example, this occurs when a target is brought to a reader at a point of sale and the reader contacts the NOC. After establishing communication with a reader, the NOC receives authentication information from the reader as shown in step 724. Alternatively, the NOC receives both the authentication information and an action request from the reader as shown in step 726. In one example the authentication information may include an a tag public key, an encrypted token, a manufacturer ID, a merchant ID, a NOC public/private key pair ID, or an embedded system ID.

After receiving the authentication information, the NOC determines if the reader is authorized to transmit action requests to the embedded system as shown in step 728. Alternatively, the NOC determines if the reader is authorized to send the received action request to the embedded system as shown in step 730. If the reader is not authorized to send any action request to the embedded system or the reader is not authorized to send the received action request to the embedded system, the NOC does not generate an authentication message as shown in step 732. This effectively ends the authentication process. However, if the NOC determines that the reader is authorized to send action requests, or the received action request, to the embedded system, the NOC proceeds to use the authentication information received from the reader to select a NOC private key from a key management database as shown in step 734. In one example, the key management database contains public/private key pairs indexed by a tuple of a manufacturer ID, a merchant ID, and a NOC public/private key pair ID.

Having selected the appropriate NOC private key, the NOC generates an authentication message as shown in step 736. The authentication message is generated using the NOC private key and the authentication information from the reader. In one example, the authentication message is generated by decrypting an encrypted token contained in the authentication information from the reader with the NOC private key. In another example, the authentication message is generated by mathematically combining the NOC private key with values in the authentication information form the reader. After generating the authentication code, the NOC transmits the authentication code to the reader as shown in step 738.

Advantageously, the information necessary to quickly compute the authentication message is separated. One portion, the authentication information, is stored on the embedded system with the target. The other portion, the NOC private key, is stored at the NOC. Persons with access to the authentication information on the embedded system cannot easily compute the authentication message without the NOC private key. The placement of necessary, but insufficient, information at two locations that can be combined to form sufficient information enables great security in the authentication process. Further, the present system and methods enable this cryptographic method with minimal computation at the embedded processor.

Figure 21:
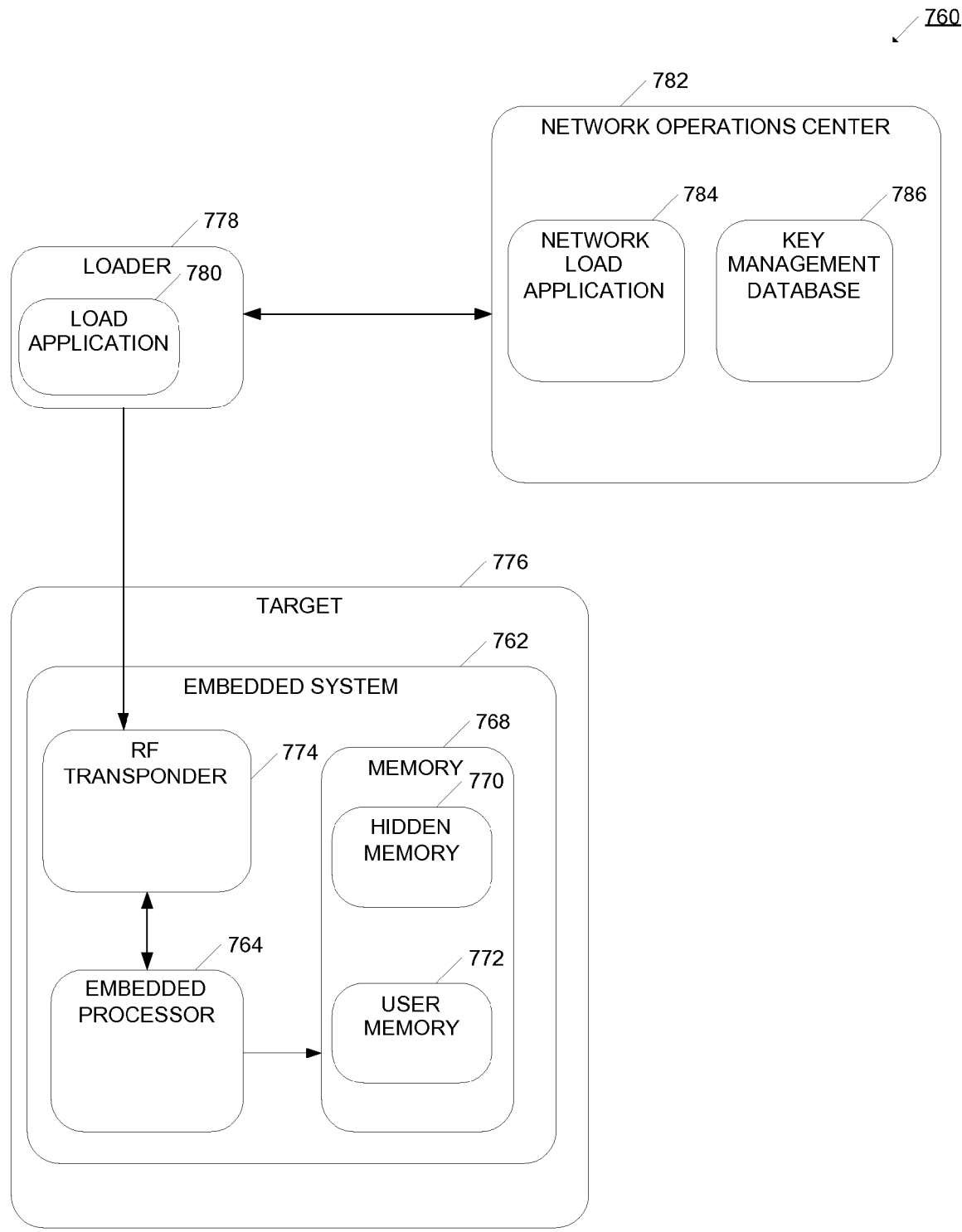
FIG. 21 is a block diagram of loading an embedded processor system in accordance with the present invention.

Referring now to FIG. 21, system 760 for loading an embedded processor is illustrated. It will be appreciated that system 760 is similar to system 430 of FIG. 13. System 760 is used to preload embedded system 762 with an authentication message and authentication information to enable subsequent secure authentication. The computationally intensive portions of the cryptographic process are performed at NOC 782 and loader 778 to enable secure authentication with minimal computation at the embedded system. Embedded system 762 has embedded processor 764, memory 768 and RF transponder 774. Memory 768 further comprises hidden memory 770 and user memory 772. It will be understood that embedded system 762 is similar to embedded system 282 described in FIG. 9. Embedded system 768 is attached to target 776. It will be understood that target 776 is similar to target 294 in FIG. 9. Target 776 may be, for example, a CD, DVD, HD DVD, Blu-Ray DVD, or gaming disc.

System 760 also has loader 778. Loader 778 is used to transmit the authentication message and authentication information to embedded system 762. In one example, loader 778 is a device located at the manufacturing site of target 776. In another example loader 778 is a device located at the manufacturing site of embedded system 762. In a third example, loader 778 is a device located at the site where embedded system 762 is attached to target 776. Loader 778 enables communication between embedded system 762 and NOC 782. Loader 778 operates load application 780. Load application 780 performs functions related to the load process. NOC 782 operates network load application 784. Network load application 784 handles communication to and from loader 778 and performs a portion of the computationally intensive cryptographic process to enable secure authentication with minimal computation at the embedded processor. NOC 782 also maintains key management database 786 to enable cryptographic features of the authentication process. It will be appreciated that system 760 enables the pre-loading of the embedded system to enable secure authentication.

Figure 22:
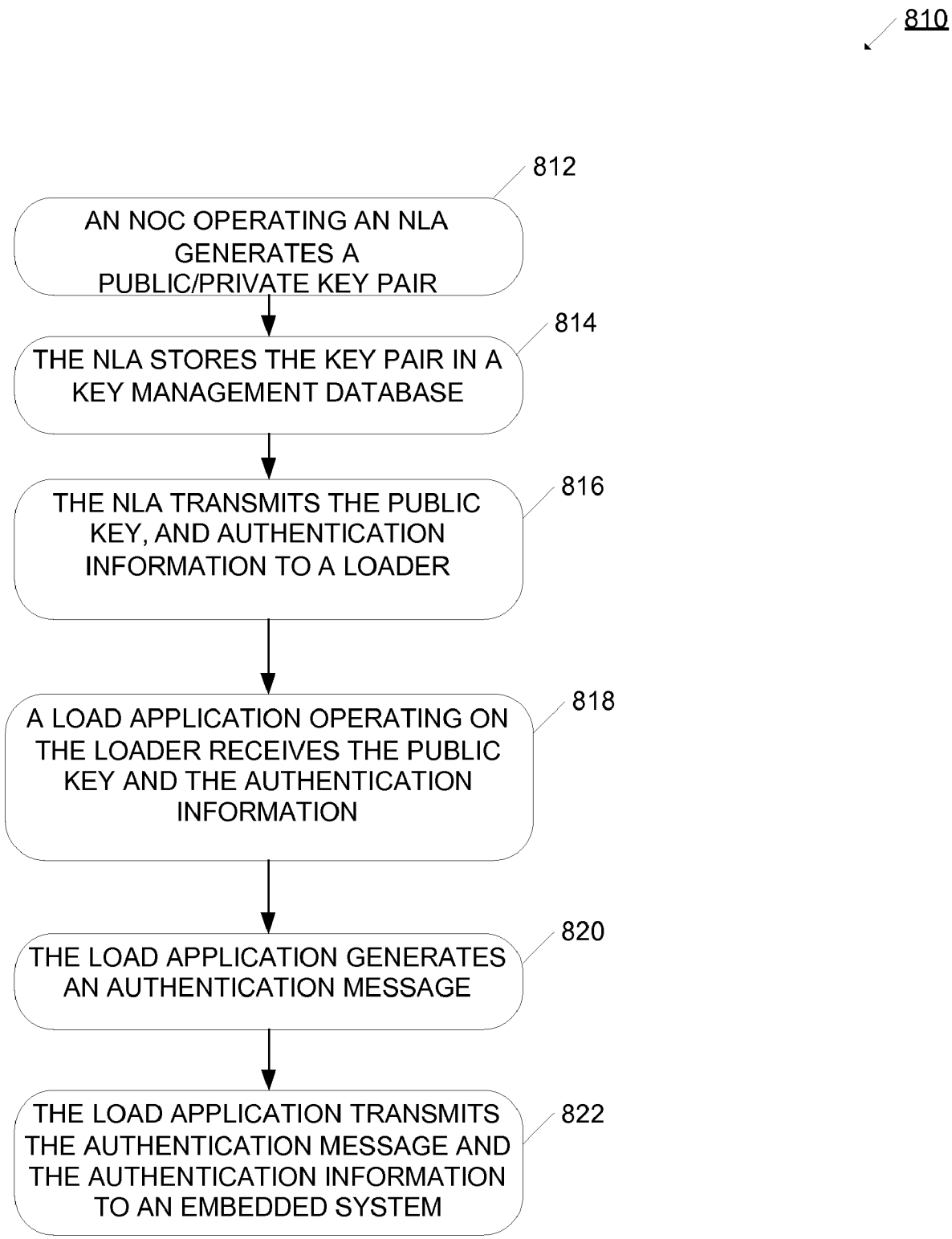
FIG. 22 is a flowchart of a process for loading an embedded processor system in accordance with the present invention.

Referring now to FIG. 22, method 810 for loading an embedded system is illustrated. Method 810 involves the operation of system 760 from FIG. 21. The execution of method 810 results in a loaded embedded system that can be subsequently used in secure authentication. Method 810 begins when the network load application (NLA) operating on a NOC generates a NOC public/private key pair as shown in step 812. In one example, the NLA generates a key pair responsive to a request from a loader. After generating the key pair, the NLA stores the NOC key pair in the key management database as shown in step 814. In one example, the NOC key pair is stored according to a tuple of a manufacturer ID number, a merchant ID number, and an embedded system ID number. In another example, only the NOC private key is stored in the key management database. After storing the NOC key pair, the NLA transmits the NOC public key and other authentication information to a loader as shown in step 816. In one example the other authentication information may include the ID number associated with the NOC public/private key pair, a manufacturer ID number, a merchant ID number, or an embedded system ID number.

After the NLA transmits the information to a loader, the load application operating on the loader receives the NOC public key and other authentication information as shown in step 818. The loader load application then uses the NOC public key and other authentication information to generate an authentication message. In one example, the activation message is an encrypted version of a plaintext token. In another example, the activation message is a mathematical combination of the NOC public key, a tag private key, and other authentication information. After generating an authentication message, the loader transmits the authentication message and other authentication information to the embedded processor as shown in step 822. In one example the authentication information may include a tag public key, an encrypted token, a manufacturer ID, a merchant ID, an embedded system ID, and a NOC public/private key pair ID.

Figure 23:
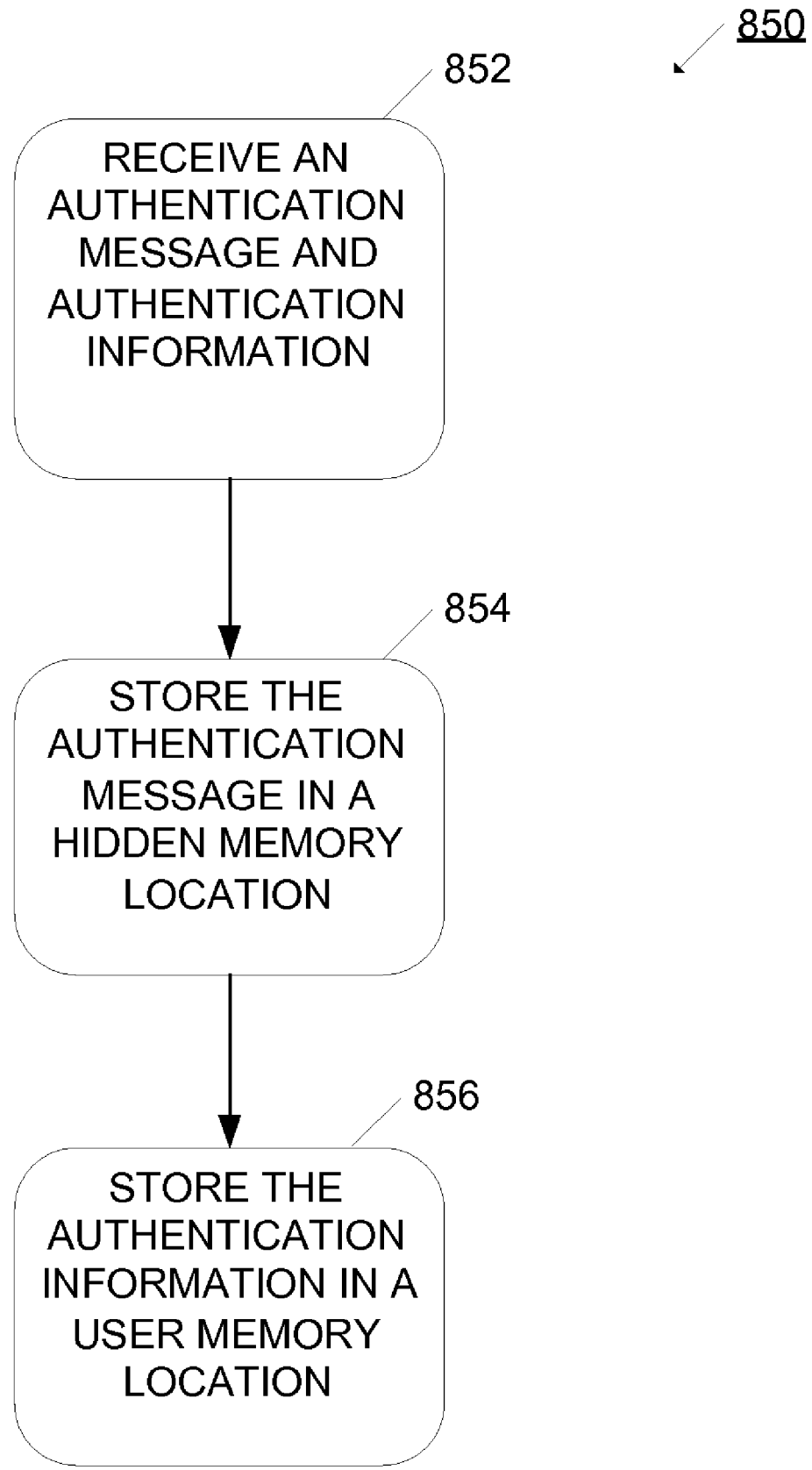
FIG. 23 is a flowchart of a process for loading an embedded processor system in accordance with the present invention.

Referring now to FIG. 23, method 850 for enabling the load process is illustrated. Method 850 operates on an embedded system. In one example, method 850 is executed at the manufacturing site of a target when the target is brought into proximity of a loader. Method 850 begins when the embedded system receives an authentication message and authentication information as shown in step 850. In one example, the authentication information may include a tag public key, an encrypted token, a manufacturer ID, a merchant ID, an embedded processor ID, or an identification number associated with a NOC public/private key pair. After receiving the authentication message and authentication information, the embedded system stores the authentication message in a hidden memory as shown in step 854. In one example, the hidden memory is a write once memory and once the authentication message has been written there, the contents of the hidden memory can no longer be changed. After storing the authentication message in hidden memory, the embedded system stores the authentication information in user memory as shown in step 856. At this point, the loading process is complete.

Figure 24A:
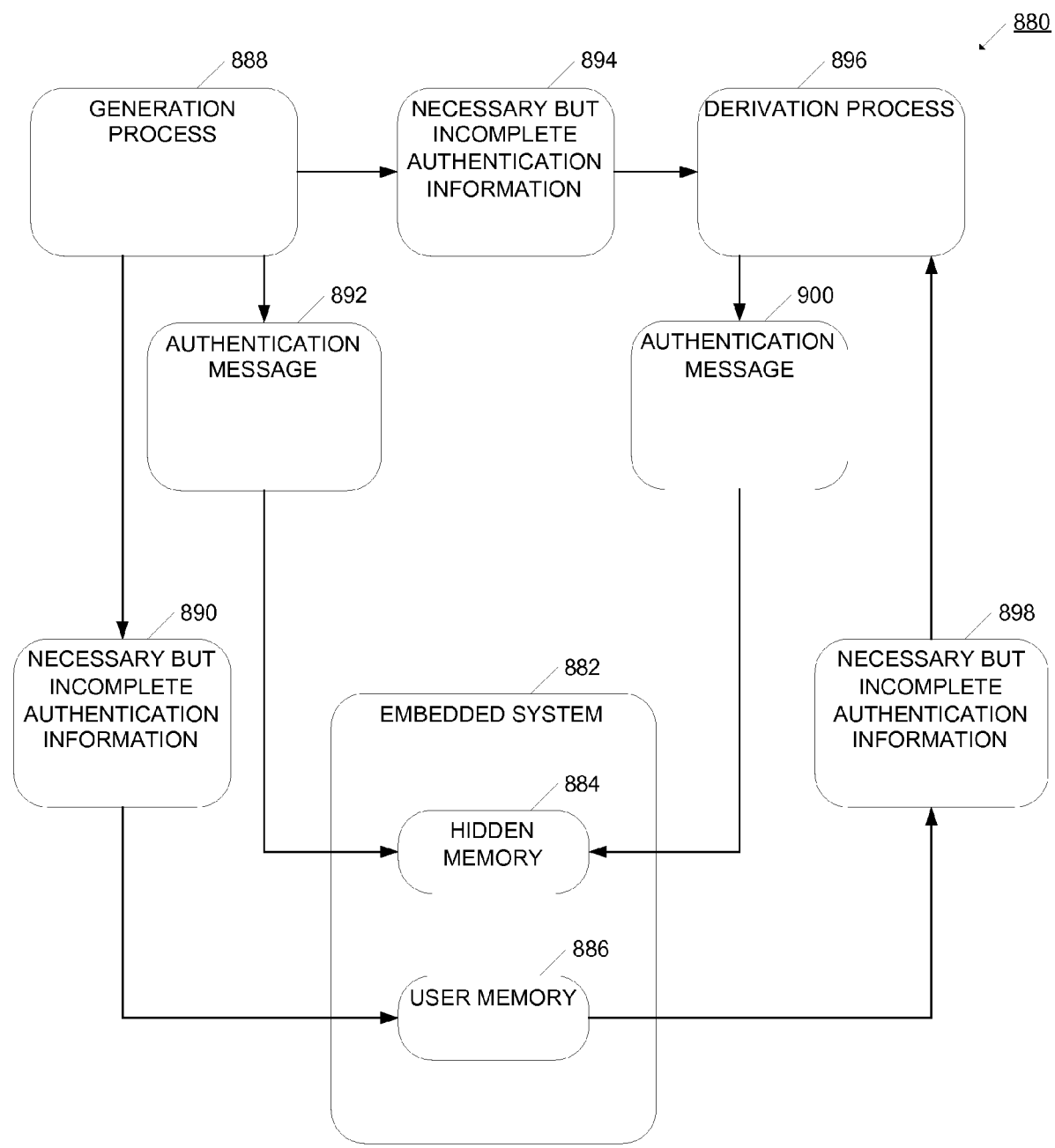
FIG. 24A is a flow diagram of a system for performing an action using an embedded system in accordance with the present invention.

Referring now to FIG. 24A, system 880 for loading and authenticating is illustrated. System 880 makes use of embedded system 882. Embedded system 882 has hidden memory 884 for storing an authentication code and user memory 886 for storing authentication information. System 882 also has generation process 888. In one example, generation process 888 is performed on a network operations center and a loader. Generation process 888 generates authentication message 892, necessary but incomplete authentication information 890, and necessary but incomplete authentication information 894. In one example, necessary but incomplete authentication information 890 may include a tag public key, an encrypted token, a manufacturer ID, a merchant ID, the ID of embedded system 882, and an identification number associated with a NOC public/private key pair. In one example, necessary but incomplete authentication information 894 is a NOC private key. Authentication message 892 is stored in hidden memory 884 and necessary but incomplete authentication information 890 is stored in user memory 886.

System 880 has derivation process 896. In one example, derivation process 896 is performed on a network operations center and a reader. Derivation process 896 receives necessary but incomplete authentication information 894. In one example, necessary but incomplete authentication information 894 is a NOC private key stored by a NOC during generation process 888 and accessed by the NOC during derivation process 896. Derivation process 880 also receives necessary but incomplete authentication information 898 from user memory 886 of embedded system 882. It will be appreciated that when combined, necessary but incomplete authentication information 898 and necessary but incomplete authentication information 894 become sufficient to quickly generate authentication message 900. Derivation process 896 uses necessary but incomplete authentication information 894 and necessary but incomplete authentication information 898 to generate authentication message 900. Authentication message 900 is transmitted to embedded system 882 and compared to authentication message 892 stored in hidden memory 884. Embedded system 882 performs an action responsive to the comparison between authentication message 892 and authentication message 900.

Figure 24B:
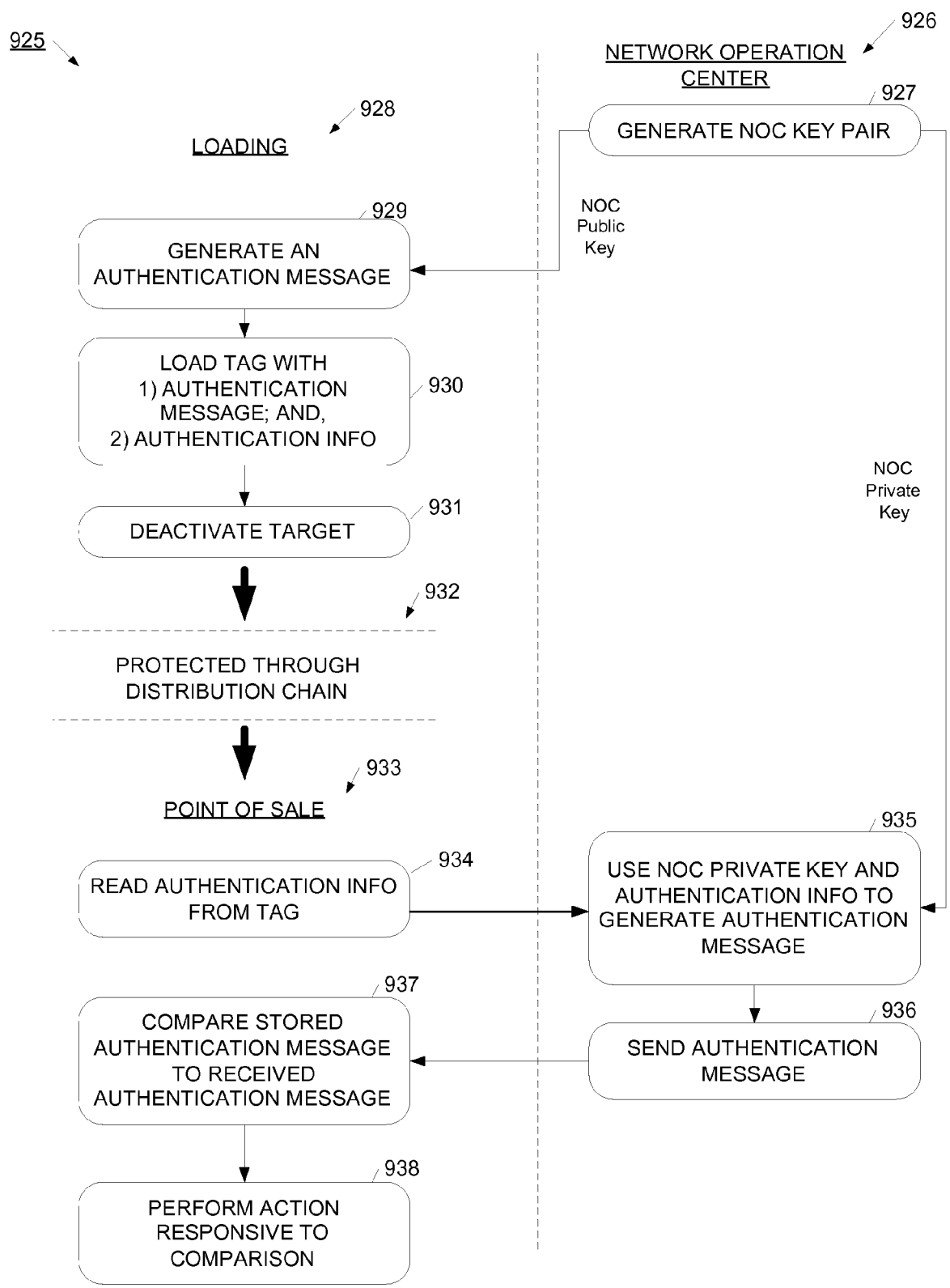
FIG. 24B is a flowchart of a method for performing an action using an embedded system in accordance with the present invention.

Referring now to FIG. 24B, method 925 for loading and authenticating is illustrated. Method 925 begins at network operation center 926. NOC 926 generates a NOC public/private key pair as shown in step 927. NOC 926 transfers the NOC public key to loader 928. Loader 928 receives the NOC public key and generates an authentication message as shown in step 929. Next, loader 928 loads the embedded system with the authentication message and other authentication information as shown in step 930. After loading the embedded system on the target, the target is deactivated as shown in step 931. Alternatively, the target leaves the manufacturing process in a deactivated state. After the embedded processor is loaded, the target is sent through the distribution chain as shown in step 932. Advantageously, the entire time the target is in the distribution chain, it is deactivated. If the target is stolen before reaching the point of sale it cannot be used.

Method 925 continues as the target reaches point of sale 933 and comes in proximity to a reader. The reader reads the authentication information from the embedded system as shown in step 934. The reader then transmits the authentication information to NOC 926. NOC 926 generates an authentication message using the authentication information from the reader and the NOC private key as shown in step 935. After generating the authentication message, NOC 935 sends the authentication message back to the reader at the point of sale as shown in step 936. The reader receives the authentication message and transmits it to the embedded system. The embedded system compares the received authentication message to the authentication message on the embedded system as shown in step 937. The embedded system performs an action responsive to the comparison as shown in step 938. In one example, the embedded system activates the target if the received plaintext token and the stored plaintext token match.

It will be appreciated that the cryptographic processes described in relation to the present system and methods offer a great deal of flexibility in determining the degree of security for a given application. In particular, the use of elliptical curve cryptography offers a high level of security in an application where the amount of information that can be stored on an embedded processor is limited. In conjunction with the use of elliptical curves, shared secrets further enhance the security of the system while limiting the amount of processing that must be performed at the embedded processor. The use of shared secrets will be described in more detail.

Figure 25:
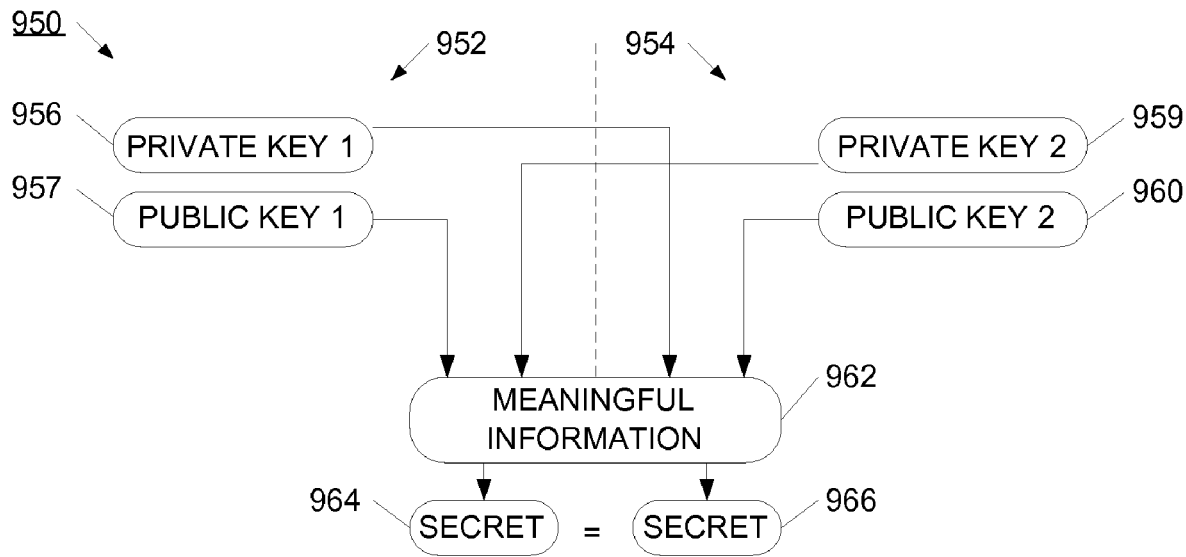
FIG. 25 is a block diagram of a cryptographic process in accordance with the present invention.

Referring now to FIG. 25, method 950 is illustrated. Method 950 underlies the loading an authentication processes described in examples above. Method 950 has public/private key pair 1 952 and public/private key pair 2 954. In one example, key pair 1 952 is generated by a NOC and key pair 2 954 is generated by a loader. The generation process for each key pair is linked such that there exists a combination of private key 1 956 and public key 2 960 that is equivalent to a combination of private key 2 959 and public key 1 957. For example, if public key 1 957 and public key 2 960 are points derived from a common generator of an elliptical curve as described in examples above, the multiplication of private key 1 956 and public key 2 960 is equal to the multiplication of private key 2 959 and public key 1 957. Accordingly, when private key 1 956 and public key 2 960 are combined with meaningful information 962, the result is a secret 966. The combination of private key 2 959 and public key 1 957 with the same meaningful information 962 results in secret 964. Secret 964 is equivalent to secret 966.

Advantageously, the set of possible secrets that can be produced by method 950 is limited by the meaningful information used. As such, some attempts to compromise the security of the systems discussed herein can be prevented by recognizing that a generated secret cannot be valid. The result is a highly secure cryptographic algorithm that can be operated without significant processing at an embedded system.

Figure 26:
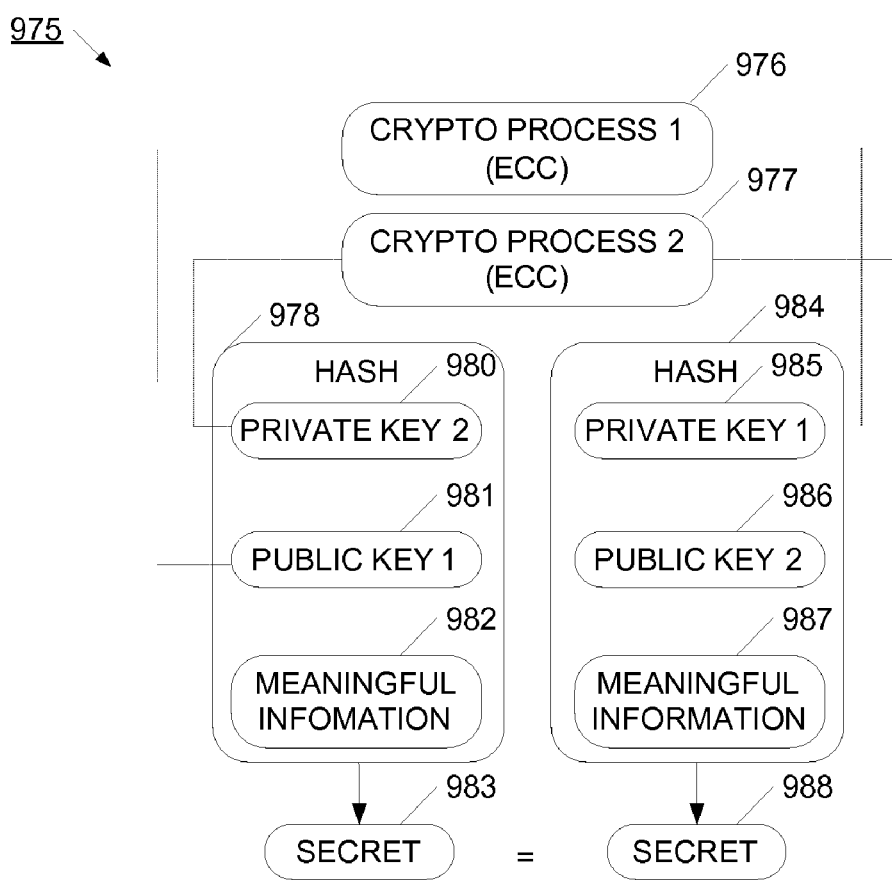
FIG. 26 is a block diagram of a cryptographic process in accordance with the present invention.

Referring to FIG. 26, system 975 for implementing the cryptographic method of FIG. 25 is illustrated. System 975 has cryptographic process 1 976. In one example, cryptographic process 1 976 is operated on a NOC. Cryptographic process 1 976 generates private key 1 985 and public key 1 981. Public key 1 981 is a point generated from an elliptical curve as described in examples above. Cryptographic process 2 977 generates private key 2 980 and public key 2 986. In one example, cryptographic process 2 977 is operated on a loader. Public key 2 986 is a point generated from the same elliptical curve as was used to generate public key 1 981. Private key 2 980, public key 1 981, and meaningful information 982 are combined used in hash 978 to produce secret 983. In one example, hash 978 is done on a loader and secret 983 is stored on an embedded system. Private key 1 985, public key 2 986, and meaningful information 987 are combined and used in hash 984 to produce secret 988. In one example hash 984 is done on a NOC and secret 988 is transmitted to the embedded system. Secret 983 is equivalent to secret 988. In one example, the embedded system compares secret 983 and secret 988 and performs an action on a target responsive to the comparison.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method operating on an RFID or NFC reader, comprising;
    requesting an encrypted token from an embedded system;
    receiving the encrypted token from the embedded system;
    transmitting the encrypted token to a network operation center;
    receiving a plaintext token from the network operation center; and,
    transmitting the plaintext token to the embedded system.

2. The method of claim 1, wherein the encrypted token and the plaintext token are related through a cryptographic algorithm.

3. The method of claim 1, wherein the encrypted token is an encrypted representation of the plaintext token.

4. The method of claim 1, wherein the encrypted token is used to derive the plaintext token.

5. The method of claim 1, further comprising the steps of;
    requesting an identifier for a public key;
    receiving the identifier for the public key; and,
    transmitting the identifier for the public key to the network operation center.

6. A method operating on an RFID or NFC reader, comprising;
    requesting a public key from an embedded system;
    receiving the public key from the embedded system;
    transmitting the public key to a network operation center;
    receiving a authentication code from the network operation center; and,
    transmitting the authentication code to the embedded system.

7. The method of claim 6, wherein the public key and the authentication code are related through a cryptographic algorithm.

8. The method of claim 6, wherein the public key is used to derive the authentication code.

9. The method of claim 6, further comprising the steps of;
    requesting an identifier for a public/private key pair;
    receiving the identifier for the public/private key pair; and,
    transmitting the identifier for the public/private key pair to the network operation center.

10. The method of claim 6, further comprising the steps of;
    requesting an identifier for a manufacturer;
    receiving the identifier for the manufacturer; and,
    transmitting the identifier for the manufacturer to the network operation center.

11. The method of claim 6, further comprising the steps of;
    requesting an identifier for a merchant;
    receiving the identifier for the merchant; and,
    transmitting the identifier for the merchant to the network operation center.

12. The method of claim 6, further comprising the steps of;
    requesting an identifier for the embedded system;
    receiving the identifier for the embedded system; and,
    transmitting the identifier for the embedded system to the network operation center.

13. A method operating on an RFID or NFC reader, comprising;
    requesting authentication information from an embedded system;
    receiving the authentication information from the embedded system;
    transmitting the authentication information to a network operation center;
    receiving an authentication message from the network operation center; and,
    transmitting the authentication message to the embedded system.

14. The system of claim 13, wherein the authentication information is selected from a group consisting of;
    an encrypted representation of the authentication message;
    a public key;
    an identifier for a public/private key pair;
    an identifier for a manufacturer; and,
    an identifier for an embedded system.

* * * * *